United States Patent
Cho et al.

(10) Patent No.: US 10,820,187 B2
(45) Date of Patent: Oct. 27, 2020

(54) ELECTRONIC DEVICE FOR MANAGING EMBEDDED SUBSCRIBER IDENTIFICATION MODULE AND METHOD FOR SAME

(71) Applicant: SAMSUNG ELECTRONICS CO., LTD., Suwon-si, Gyeonggi-do (KR)

(72) Inventors: Heejeong Cho, Seoul (KR); Sanghwi Lee, Suwon-si (KR); Jeongdon Kang, Suwon-si (KR); Killyeon Kim, Suwon-si (KR); Jaehyeon Seo, Yongin-si (KR); Sangsoo Lee, Suwon-si (KR); Yoonjung Jung, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 6 days.

(21) Appl. No.: 16/197,452

(22) Filed: Nov. 21, 2018

(65) Prior Publication Data

US 2019/0222999 A1 Jul. 18, 2019

(30) Foreign Application Priority Data

Jan. 12, 2018 (KR) .......................... 10-2018-0004714

(51) Int. Cl.
*H04W 8/18* (2009.01)
*H04L 29/06* (2006.01)
(Continued)

(52) U.S. Cl.
CPC ......... *H04W 8/183* (2013.01); *H04L 63/0876* (2013.01); *H04L 63/102* (2013.01);
(Continued)

(58) Field of Classification Search
None
See application file for complete search history.

(56) References Cited

U.S. PATENT DOCUMENTS 9,854,426 B1 * 12/2017 Wang ...................... H04W 8/02
10,346,147 B2 * 7/2019 Park ...................... H04L 63/102
(Continued)

FOREIGN PATENT DOCUMENTS

WO PCT/KR2016/001619 * 8/2016

OTHER PUBLICATIONS

International Search Report dated Feb. 25, 2019 in counterpart International Patent Application No. PCT/KR2018/014256.

*Primary Examiner* — Jay L Vogel
(74) *Attorney, Agent, or Firm* — Nixon & Vanderhye P.C.

(57) ABSTRACT

In an electronic device launching a communication service according to various embodiments and a method of operating the electronic device, the electronic device includes a memory configured to store device information corresponding to the electronic device; a first communication module comprising communication circuitry configured to establish a first communication connection corresponding to a first communication method with an external server; a second communication module comprising communication circuitry configured to establish a second communication connection corresponding to a second communication method with an external electronic device; and a processor, wherein the processor is configured to establish the first communication connection with the external server using the first communication module, to transmit the device information to the external server through the first communication connection, to receive one or more service identifiers corresponding to one or more services available to the external electronic device from the external server, to establish the second communication connection with the external electronic device using the second communication module, and to transmit control information based on at least a part of an identifier corresponding to at least one service of the one or (Continued)

more services to the external electronic device to activate the at least one service in the external electronic device.

13 Claims, 16 Drawing Sheets

(51) Int. Cl.

| | |
|---|---|
| *H04W 12/00* | (2009.01) |
| *H04W 12/06* | (2009.01) |
| *H04W 12/04* | (2009.01) |
| *H04W 4/60* | (2018.01) |
| *H04W 52/02* | (2009.01) |
| *H04W 76/15* | (2018.01) |
| *H04W 4/50* | (2018.01) |
| *H04W 88/04* | (2009.01) |
| *H04L 29/08* | (2006.01) |
| *H04W 88/06* | (2009.01) |
| *H04W 76/11* | (2018.01) |
| *A45C 5/14* | (2006.01) |
| *A45C 13/26* | (2006.01) |

(52) U.S. Cl.
CPC ............... *H04W 4/50* (2018.02); *H04W 4/60* (2018.02); *H04W 12/00401* (2019.01); *H04W 12/0401* (2019.01); *H04W 12/06* (2013.01); *H04W 52/0261* (2013.01); *H04W 76/15* (2018.02)

(56) References Cited

U.S. PATENT DOCUMENTS

| | | | |
|---|---|---|---|
| 2008/0259837 A1* | 10/2008 | Thoukydides | H04W 16/14 370/311 |
| 2011/0021200 A1* | 1/2011 | Yi | H04L 65/1016 455/442 |
| 2015/0281198 A1 | 10/2015 | Lee et al. | |
| 2016/0020804 A1 | 1/2016 | Lee et al. | |
| 2016/0050557 A1* | 2/2016 | Park | H04W 12/04 455/419 |
| 2016/0080932 A1* | 3/2016 | Jin | H04W 4/60 455/418 |
| 2016/0095140 A1 | 3/2016 | Gupta | |
| 2016/0150400 A1* | 5/2016 | Cha | H04M 1/0266 455/418 |
| 2017/0280328 A1 | 9/2017 | Yang et al. | |
| 2017/0338954 A1 | 11/2017 | Yang et al. | |
| 2017/0338962 A1 | 11/2017 | Li et al. | |
| 2018/0041601 A1* | 2/2018 | Park | H04W 12/04031 |
| 2018/0255451 A1* | 9/2018 | Fan | H04B 1/3816 |
| 2018/0352432 A1* | 12/2018 | Barki | H04L 9/3073 |
| 2019/0335319 A1* | 10/2019 | Li | H04W 8/205 |

\* cited by examiner

ELECTRONIC DEVICE FOR MANAGING EMBEDDED SUBSCRIBER IDENTIFICATION MODULE AND METHOD FOR SAME

CROSS-REFERENCE TO RELATED APPLICATION

This application is based on and claims priority under 35 U.S.C. § 119 to Korean Patent Application No. 10-2018-0004714, filed on Jan. 12, 2018, in the Korean Intellectual Property Office, the disclosure of which is incorporated by reference herein in its entirety.

BACKGROUND

1) Field

The disclosure relates to an electronic device for managing an embedded subscriber identification module (eSIM) and a method of operating the electronic device, and for example to, a technique for managing an eSIM of an external electronic device connected to an electronic device.

2) Description of Related Art

Various electronic devices such as a smart phone, a tablet PC, a portable multimedia player (PMP), a personal digital assistant (PDA), a laptop personal computer, a wearable device, etc., are becoming popular.

Such various electronic devices can use a network provided by a communication company to perform wireless communication. To use the network provided by the communication company, authentication between a server provided by the communication company and an electronic device is required, and the electronic device can perform authentication with the server provided by the communication company using a profile stored in the electronic device.

When a plurality of electronic devices including a smart phone, a tablet, a wearable device, an electronic device with Internet on thing (IoT) technology, etc., includes a universal integrated circuit card (UICC), a separate subscription service (e.g., a subscription service in a shop operated by a communication service provider) provided by a communication service provider can be used in order to perform subscription and management for communication services (e.g., communication services using a cellular network provided by the communication service provider) available to the plurality of electronic devices.

However, in order to proceed with the subscription service for each of the plurality of electronic devices, a troublesome procedure such as visiting an offline store operated by the communication service provider may be required.

Alternatively, in the case of an electronic device having a display screen of a small size for proceeding with the subscription service or an electronic device having no display among the plurality of electronic devices, it may be difficult to proceed with the subscription service.

SUMMARY

In accordance with an example aspect of the disclosure, an electronic device may include: a memory configured to store device information corresponding to the electronic device; a first communication module comprising communication circuitry configured to establish a first communication connection corresponding to a first communication method with an external server; a second communication module comprising communication circuitry configured to establish a second communication connection corresponding to a second communication method with an external electronic device; and a processor, wherein the processor is configured to establish the first communication connection with the external server using the first communication module, to transmit the device information to the external server through the first communication connection, to receive one or more service identifiers corresponding to one or more services available to the external electronic device from the external server, to establish the second communication connection with the external electronic device using the second communication module, and to transmit control information based on at least a part of an identifier corresponding to at least one service of the one or more services to the external electronic device to activate the at least one service in the external electronic device.

In accordance with another example aspect of the disclosure, an electronic device may include: a memory configured to store device information corresponding to the electronic device and identifiers of one or more services available to an external electronic device; a first communication module comprising communication circuitry configured to establish a first communication connection corresponding to a first communication method with an external server; a second communication module comprising communication circuitry configured to establish a second communication connection corresponding to a second communication method with the external electronic device; and a processor, wherein the processor is configured to establish the first communication connection with the external server using the first communication module, to transmit the device information to the external server through the first communication connection, to establish the second communication connection with the external electronic device using the second communication module, and to transmit control information based on at least a part of an identifier corresponding to at least one service of the one or more services to the external electronic device to activate the at least one service in the external electronic device.

In accordance with still another example aspect of the disclosure, an electronic device may include: a memory configured to store device information corresponding to the electronic device; a first communication module comprising communication circuitry configured to establish a first communication connection corresponding to a first communication method with an external server; and a processor, wherein the processor is configured to establish the first communication connection with the external server using the first communication module, to transmit the device information to the external server through the first communication connection, to receive one or more service identifiers corresponding to one or more services available to the electronic device from the external server, and to transmit a signal requesting activation based on at least a part of an identifier corresponding to at least one service of the one or more services to the external server to activate the at least one service in the electronic device.

In accordance with yet another example aspect of the disclosure, an electronic device may include: a memory configured to store device information corresponding to the electronic device; a first communication module comprising communication circuitry configured to establish a first communication connection corresponding to a first communication method with an external server; a second communication module comprising communication circuitry configured to establish a second communication connection corresponding to a second communication method with an external electronic device; and a processor, wherein the processor is configured to establish the second communication connection with the external electronic device using the second communication module, to receive device information of the external electronic device from the external electronic device, to determine whether a profile exists in the external electronic device based on the device information of the external electronic device, to determine whether the external electronic device is first connected to the electronic device in response to determining that the profile exists, and to transmit control information based on at least a part of an identifier corresponding to at least one service available to the external electronic device to the external electronic device to activate the at least one service in the external electronic device based on the determination result.

In accordance with a further example aspect of the disclosure, an electronic device may include: a first communication module comprising communication circuitry configured to establish a first communication connection corresponding to a first communication method with a first external electronic device; and a processor, wherein the processor is configured to establish the first communication connection with the first external electronic device using the first communication module, to receive device information transmitted by the first external electronic device, and to transmit one or more service identifiers corresponding to one or more services available to a second external electronic device connected to the first external electronic device, to the first external electronic device.

According to various example embodiments of the disclosure, an electronic device performing communication service subscription and a method of operating the electronic device may perform communication service subscription using an electronic device connected to an external electronic device, which may be a communication service subscription target, thereby smoothly performing communication service subscription and management procedures with respect to the external electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
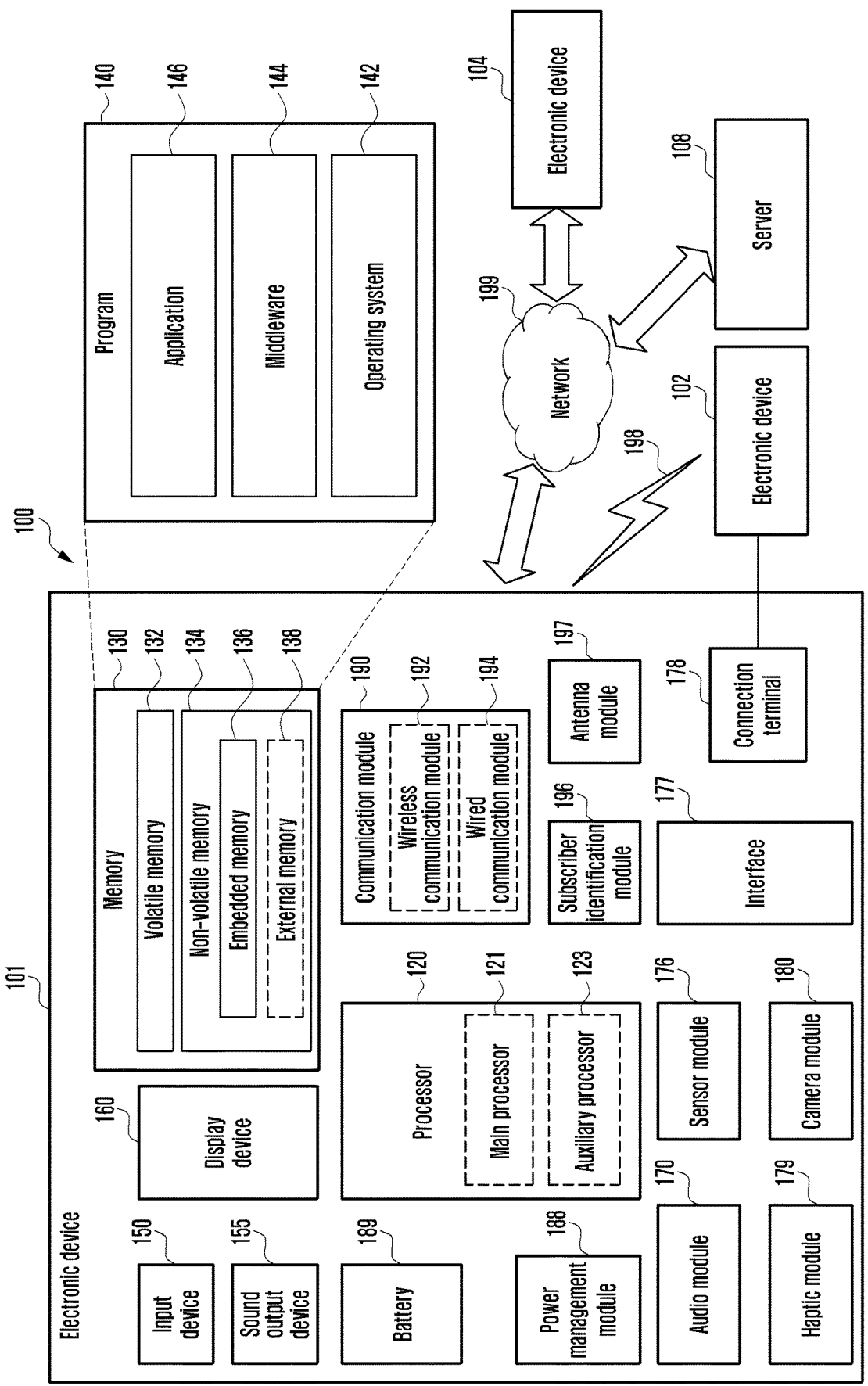
FIG. 1 is a block diagram illustrating an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
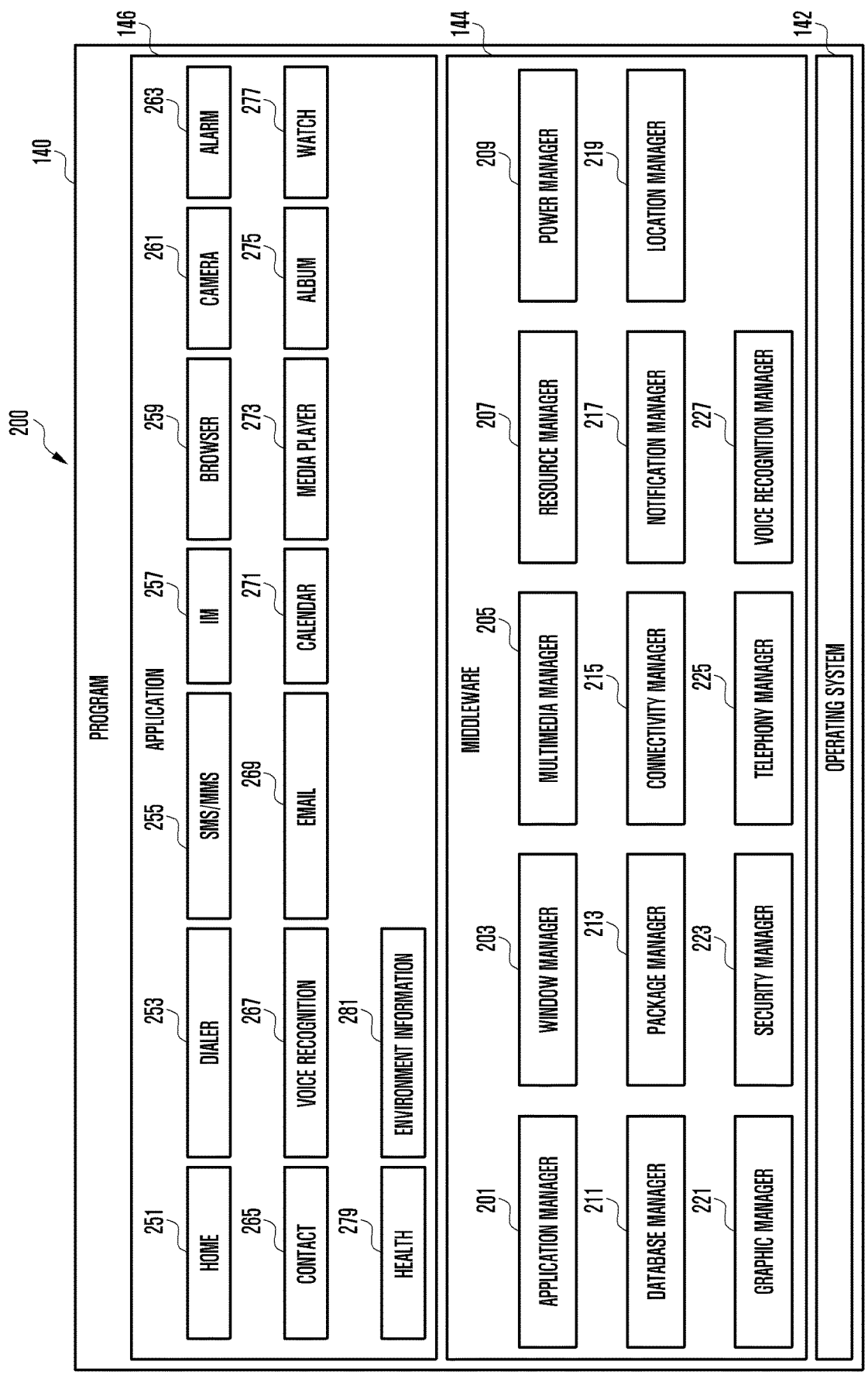
FIG. 2 is a block diagram illustrating a program according to various embodiments of the disclosure.

FIG. 2 is a block diagram 200 illustrating the program 140 according to various embodiments. According to an embodiment, the program 140 may include an operating system (OS) 142 to control one or more resources of the electronic device 101, middleware 144, and/or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, and without limitation, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, and without limitation, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), and/or environmental information 281 (e.g., for measuring air pressure, humidity, or temperature information) application, or the like. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

In various embodiments of the disclosure, a universal integrated circuit card (UICC) may, for example, include a smart card inserted into a mobile communication terminal, and may refer to a chip in which personal information such as network connection authentication information, phone book, SMS, etc., of a mobile communication subscriber is stored and subscriber authentication and traffic security key generation are performed when connecting to a mobile communication network such as GSM, WCDMA, LTE, or the like to enable secure mobile communication use. The UICC may be equipped with a communication application such as a subscriber identification module (SIM), a universal SIM (USIM), or an IP multimedia SIM (ISIM) depending on the type of the mobile communication network to which a subscriber is connected. In addition, the UICC can provide a high level security function for mounting various applications such as electronic wallet, ticketing, e-passport, etc.

In various embodiments of the disclosure, an embedded UICC (eUICC) may be a chip type security module embedded in a terminal rather than being detachable therefrom, which can be inserted into or detached from the terminal. The eUICC may download and install a profile using over the air (OTA) technology. The eUICC can be named UICC, which can download and install profiles.

In various embodiments of the disclosure, a method of downloading and installing a profile using OTA technology in the eUICC can be applied to a detachable UICC that can be inserted into or detached from a terminal. The embodiments of the disclosure can be applied to a UICC that can download and install a profile using OTA technology.

In various embodiments of the disclosure, the term 'UICC' may be used interchangeably with a SIM, and the term 'eUICC' may be used interchangeably with an embedded SIM (eSIM).

In various embodiments of the disclosure, a profile may refer, for example, to an application, a file system, an authentication key value, or the like stored in the UICC is packaged in a software form.

In various embodiments of the disclosure, a USIM profile may have the same meaning as the profile, or may refer, for example, to information contained in a USIM application in a profile packaged in a software form.

In various embodiments of the disclosure, a profile providing server may be expressed as a subscription manager data preparation (SM-DP), a subscription manager data preparation plus (SM-DP+), an off-card entity of profile domain, a profile encryption server, a profile creation server, a profile provisioner (PP), a profile provider, a profile provisioning credentials holder (PPC holder) or server, or the like.

In various embodiments of the disclosure, a profile information delivery server may be expressed as a discovery and push function (DPF) or a subscription manager discovery service (SM-DS).

In various embodiments of the disclosure, a profile management server may be expressed as a subscription manager secure routing (SM-SR), a subscription manager secure routing plus (SM-SR +), an off-card entity of eUICC profile manager, a profile management credentials holder (PMC holder), or an EM eUICC manager (EM).

In various embodiments of the disclosure, a profile server may be expressed as a server on which at least one of operations performed by a profile providing server, a profile management server, and a profile information delivery server can be performed.

The term 'terminal' as used in various embodiments herein may be referred to a mobile station (MS), a user equipment (UE), a user terminal (UT), a wireless terminal, an access terminal (AT), a terminal, a subscriber unit, a subscriber station (SS), a wireless device, a wireless communication device, a wireless transmission/reception unit (WTRU), a mobile node, a mobile, or other terminologies. Various examples of the terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and playback appliance having a wireless communication function, an Internet appliance capable of wireless Internet connection and browsing, a wearable device capable of being attached to or detached from a user's body, and a portable unit or terminals incorporating combinations of such functions. In addition, the terminal may include a machine to machine (M2M) terminal and a machine type communication (MTC) terminal/device, but is not limited thereto. In various embodiments of the disclosure, the terminal may be referred to as an electronic device.

In various embodiments of the disclosure, a UICC that can download and install a profile may be embedded in an electronic device or an external electronic device. If the UICC is not embedded in the electronic device, the UICC physically separated from the electronic device may be inserted into the electronic device and connected to the electronic device. For example, the UICC in the form of a card can be inserted into the electronic device. The electronic device may include the terminal, and at this time, the terminal may be a terminal including a UICC that can download and install a profile. The UICC may be embedded or inserted in the terminal. The UICC that can download and install a profile may be referred to as, for example, an eUICC.

In various embodiments of the disclosure, a profile identifier may be referred to as a factor matching with a profile ID, an integrated circuit card ID (ICCID), an ISD-P, or a profile domain (PD). The profile ID may represent a unique identifier of each profile.

In various embodiments of the disclosure, an eUICC identifier (eUICC ID) may be a unique identifier of an eUICC embedded in a terminal and may be referred to as an eUICC ID (EID). If a provisioning profile is loaded in the eUICC, the eUICC ID may refer to an identifier of the corresponding provisioning profile (profile ID of the provisioning profile). If a terminal and an eUICC chip are not separated, the eUICC ID may be a terminal ID. The eUICC ID may be referred to as a specific secure domain of the eUICC chip.

Hereinafter, an electronic device according to various embodiments of the disclosure will be described in greater detail.

Figure 3:
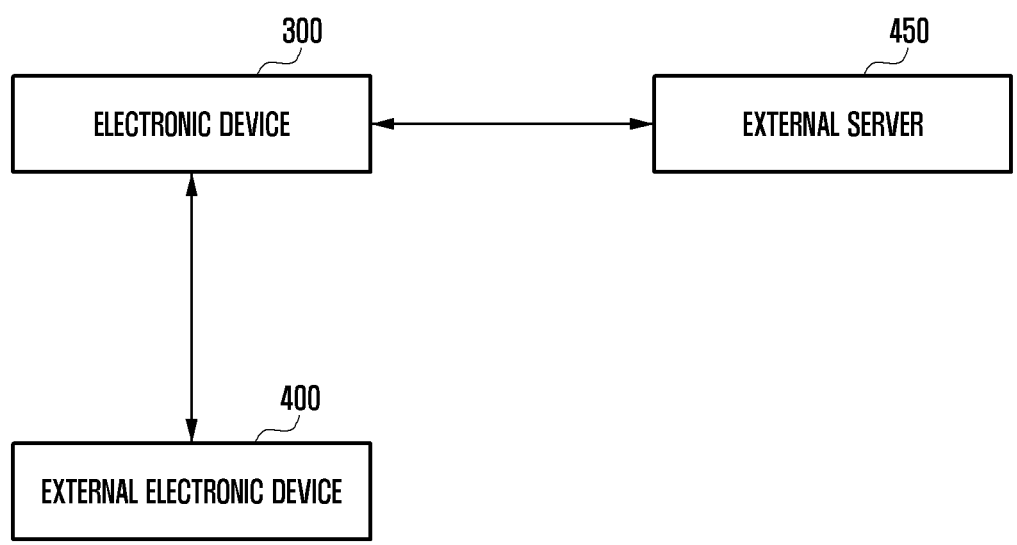
FIG. 3 is a block diagram illustrating a relationship among an electronic device, an external electronic device, and an external server according to various embodiments of the disclosure.

FIG. 3 is a block diagram illustrating the relationship among an electronic device 300, an external electronic device 400, and an external server 450 according to various embodiments of the disclosure According to various embodiments of the disclosure, the electronic device 300, the external electronic device 400, and the external server 450 may include at least some of various components included in an electronic device 101 shown in FIG. 1.

According to various embodiments, the electronic device 300 may be connected to the external electronic device 400 using various communication means (e.g., which may be referred to various communication means capable of performing data transmission/reception, such as a short-distance communication means such as Bluetooth, NFC, or Wi-Fi, a long-distance communication means such as LTE or 5G, etc.). According to various embodiments of the disclosure, the electronic device 300 may perform at least a part of an operation of installing, on the external electronic device 400, a profile for the external electronic device 400 to use a communication service provided by a communication service provider (e.g., various communication means such as 3G LTE, 4G, 5G etc.). According to various embodiments of the disclosure, the electronic device 300 may perform at least a part of an operation of managing (e.g., changing a communication service plan, deactivating a communication service, performing communication service unsubscription) a communication service available to the external electronic device 400, or the like.

According to various embodiments of the disclosure, the external electronic device 400 may refer to an electronic device that transmits/receives various data using a communication service provided by a communication service provider. For example, the external electronic device 400 may include a smart phone, a wearable device, various electronic devices supporting IoT, and the like. A profile may be installed in the external electronic device 400 in order to use a communication service provided by a communication service provider.

According to various embodiments of the disclosure, the UICC that can download and install a profile may be embedded in the external electronic device 400. The UICC, which is physically separated from the external electronic device 400, may be inserted into and connected to the electronic device. For example, the UICC in the form of a card may be inserted into the external electronic device 400. The UICC may be embedded in or inserted into the external electronic device 400 to be connected to the external electronic device 400. The UICC that can download and install a profile may be referred to as, for example, an eUICC.

According to various embodiments of the disclosure, the profile may refer to connection information for connection to a communication company that manages communication used by the external electronic device. The connection information may include an international mobile subscriber identity (IMSI) which is a type of subscriber identifier, and a value required for authentication for the use of a network provided by a communication company together with the subscriber identifier.

According to various embodiments of the disclosure, the external server 450 may refer to a server (e.g., an entitlement server) that performs eligibility management for the communication service used by the external electronic device 400 or the electronic device 300. The external electronic device 450 may store information on a plan available to a user of the electronic device 300 or the external electronic device 400 and information on at least one service available to the external electronic device 400, and may transmit, to the electronic device 300 or the external electronic device 400, identifiers of at least one service available to the user of the electronic device 300 or the external electronic device 400 in response to a request from the electronic device 300 or the external electronic device 400. Alternatively, the external server 450 may determine whether the electronic device 300 or the external electronic device 400 is authorized to use the communication service, based on data transmitted by the electronic device 300 (e.g., device information of the electronic device 300 or device information of the external electronic device 400). According to various embodiments, the external server 450 may have lower security than that of a profile providing server. For example, data that requires lower security than that of the profile (e.g., at least one identifier or configuration information associated with a communication service) may be provided.

According to various embodiments of the disclosure, the configuration information associated with the communication service may refer to data that can be used to activate or deactivate the communication service. For example, the configuration information associated with the communication service may include various information such as information (e.g., which may refer to information in the form of flag in which data indicating function activation is denoted by 1 and data indicating function deactivation is denoted by 0) indicating whether to activate or deactivate at least one communication service or whether to activate or deactivate at least some of functions associated with the communication service, or information indicating whether to activate other services associated with the communication service corresponding to the configuration information.

Although FIG. 3 shows that the external electronic device 400 and the external server 450 are singular, this is shown for convenience of explanation, and the external electronic device 400 and the external server 450, which may be connected to the electronic device 300, may be plural.

Figure 4A:
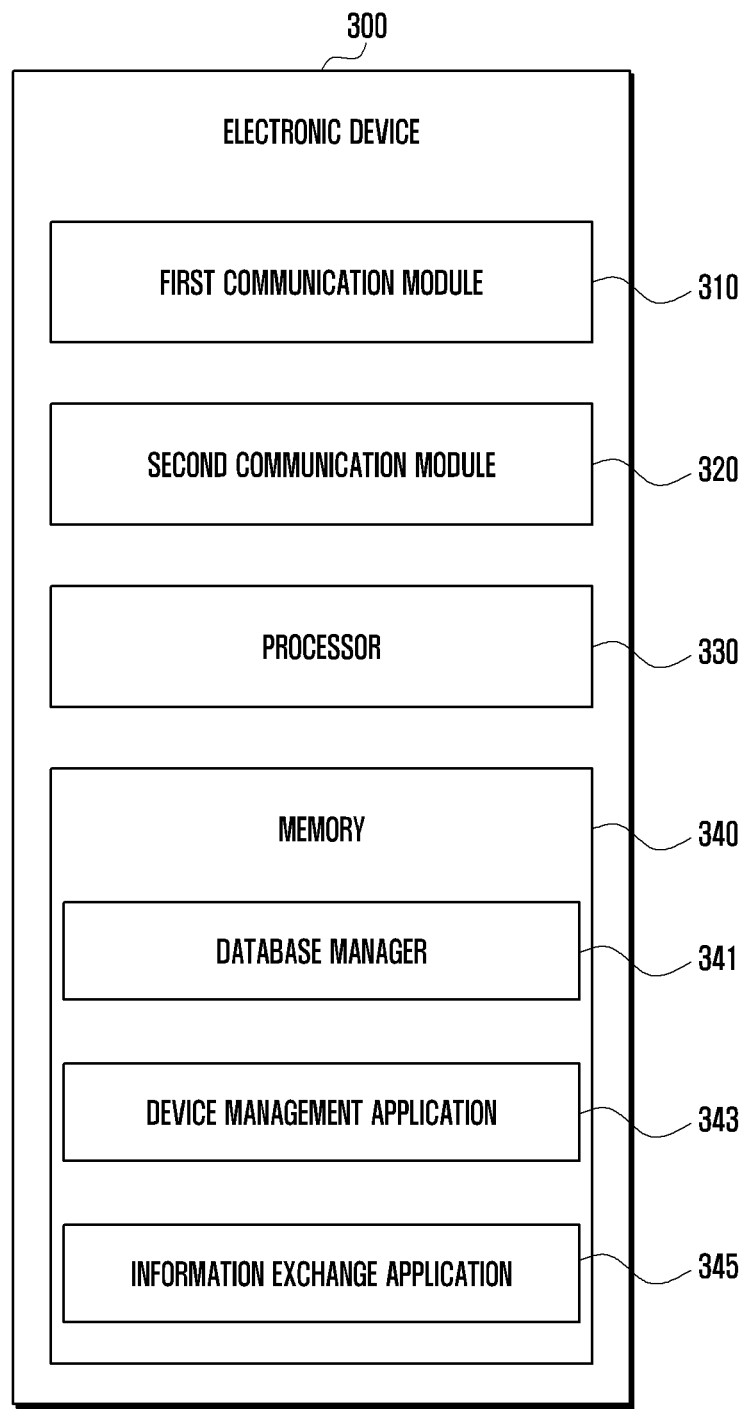
FIG. 4A is a block diagram illustrating an electronic device according to various embodiments of the disclosure.

FIG. 4A is a block diagram illustrating the electronic device 300 according to various embodiments of the disclosure.

Referring to FIG. 4A, the electronic device 300 according to various embodiments of the disclosure may include a first communication module (e.g., including communication circuitry) 310, a second communication module (e.g., including communication circuitry) 320, a processor (e.g., including processing circuitry) 330, and a memory 340.

According to various embodiments of the disclosure, the first communication module 310 may include various communication circuitry and establish a first communication connection corresponding to a first communication method with the external server 450, and may transmit and receive data to and from the external server 450. According to various embodiments of the disclosure, the first communication method may refer to a communication method (e.g., a cellular communication method, a Wi-Fi communication method, or the like) capable of establishing a connection with the external server 450.

According to various embodiments of the disclosure, the electronic device 300 may receive data required for installing a profile in an eUICC included in the external electronic device 400 through the first communication module 310. The data required for installing the profile may be received from a profile providing server (not shown) (e.g., an SM-DP+ server) provided by a communication service provider. The data required for installing the profile may be provided in the form of an encrypted profile package. The encryption of the profile may follow a standard specification defined in SGP. 22, but is not limited thereto. The data required for installing the profile may include the profile.

According to various embodiments of the disclosure, the second communication module 320 may include various communication circuitry and establish a second communication connection corresponding to a second communication method (e.g., including a short-distance communication method such as Bluetooth, NFC, Wi-Fi direct, or the like) with the external electronic device 400.

According to various embodiments of the disclosure, when receiving the profile, the processor 330 may include various processing circuitry and perform at least a part of an operation of installing the profile in the external electronic device 400.

According to various embodiments of the disclosure, the processor 330 may retrieve an address of a profile providing server that provides the profile.

According to various embodiments of the disclosure, the processor 330 may receive a profile download address list stored in the external electronic device 400 from the external electronic device 400, in order to receive the profile. The processor 330 may make a connection to the address of at least one profile providing server included in the profile download address list, and may attempt to download the profile from the connected server if the connection is successful.

According to various embodiments of the disclosure, the processor 330 may make a connection to at least one profile providing server address included in the profile download address list stored in the external electronic device 400, and may attempt to make a connection to the address of the server included in the profile download address list stored in the electronic device 300 if the downloading of the profile fails. If the connection is successful, the processor 330 may attempt to download the profile from the connected profile providing server.

According to various embodiments of the disclosure, the processor 330 may make a connection to at least one profile providing server address included in the profile download address list stored in the electronic device 300, and may verify a mobile country code (MCC) stored in a memory 440 of the external electronic device 400 if the downloading of the profile fails. The processor 330 may attempt to be connected to the address of the profile providing server of at least one carrier corresponding to the MCC, and may attempt to download the profile from the connected profile providing server.

According to various embodiments of the disclosure, if the downloading of the profile fails, the profile may not be present in the profile providing server. In a case in which the profile does not exist, it may be caused by various causes. This may be because the user of the external electronic device 400 may not be registered in the communication service provided by the communication service provider, or the external electronic device 400 has not yet been registered even if the user has been subscribed in the communication service.

According to various embodiments of the disclosure, the electronic device 300 may receive, from the profile providing server or the external server 450, an indication that the downloading of the profile has failed or an indication that the profile does not exist in the profile providing server.

According to various embodiments of the disclosure, when the processor 330 receives the indication that the profile does not exist in the profile providing server, the processor 330 may transmit, to the external server 450 or the profile providing server, a request for a web address to be used for subscription to the communication service for the external electronic device 400.

The external server 450 may request generation of the profile from the profile providing server according to services available to the external electronic device 400. To this end, the external server 450 may transmit a web address capable of selecting a plan or the like, which can be used by the external electronic device 400, to the electronic device 300 to generate the profile. The processor 330 may receive the web address and may receive a user input in which a user performs a plan selection on a web page. The processor 330 may transmit the user input to the external server 450. The external server 450 may proceed with communication service subscription of the external electronic device 400 based on the user input, and may request the profile providing server to generate or provide the profile of the external electronic device 400. The processor 330 may request downloading of the profile from the profile providing server, may receive the profile from the profile providing server, and may transmit the received profile to the external electronic device 400.

The processor 330 may transmit the downloaded profile to the external electronic device 400. The processor 330 may control the external electronic device 400 to install the received profile or may transmit a request for installing the profile to the external electronic device 400.

According to various embodiments of the disclosure, the processor 330 may install the profile in the UICC included in the external electronic device 400. For example, the profile may be received as a profile package in an encrypted form. The processor 330 may perform a decryption operation on the encrypted profile package and may install the profile on the UICC included in the external electronic device 400 using the decrypted profile package. A process of installing the profile may be performed using OTA technology. An encryption key used for encryption and decryption may be an encryption key generated through mutual authentication between the electronic device 300 and the profile providing server, and may follow a standard specification defined in SGP. 22, but is not limited thereto.

According to various embodiments of the disclosure, the processor 330 may transmit device information of the electronic device 300 to the external server 450. The processor 330 may receive device information of the external electronic device 400 from the external electronic device 400, and may transmit the device information of the external electronic device 400 and the device information of the electronic device 300 to the external server 450. The device information of the electronic device 300 or the device information of the external electronic device 400 may be used to retrieve services available to the electronic device 300 or the external electronic device 400 in the external server 450. According to an embodiment, the processor 330 may receive information of the external electronic device 400 through the establishment of the second communication connection corresponding to the second communication method (e.g., including a short-distance communication method such as Bluetooth, Wi-Fi direct, NFC, or the like) with the external electronic device 400.

According to various embodiments of the disclosure, the external server 450 may retrieve at least one service available to the electronic device 300 or the external electronic device 400 using the device information of the electronic device 300 or the device information of the external electronic device 400. The external server 450 may transmit identifiers of the at least one services available to the external electronic device 400 to the electronic device 300.

According to various embodiments of the disclosure, the services available to the external electronic device 400 may include services that can be executed in association with the electronic device 300 and the external electronic device 400. For example, the services available to the external electronic device 400 may include services (e.g., one-number service transmitting/receiving a call based on the same telephone number) that can be provided by a plurality of electronic devices (e.g., the electronic device 300 and the external electronic device 400) based on the same telephone number, automatic phone forwarding services which are automatically forwarded to other electronic devices if there is no response in a situation where a call is received at one of the plurality of electronic devices (e.g., the electronic device 300 and the external electronic device 400), cellular modem ON/OFF services for automatically activating/deactivating a modem using a cellular communication, message sync services or telephone history sync services for synchronizing message and telephone transmission/reception histories between the plurality of electronic devices (e.g., the electronic device 300 and the external electronic device 400), and the like.

According to various embodiments of the disclosure, the processor 330 may select a service that can be executed in association with the electronic device 300 and the external electronic device 400 or a service that is not executed in the electronic device 300 but can be executed in the external electronic device 400, and may perform at least a part of an operation of activating the selected service.

According to various embodiments of the disclosure, the processor 330 may transmit control information based on at least a part of an identifier corresponding to at least one service to the external electronic device 400 so that the at least one service can be activated in the external electronic device 400. At least one identifier may include at least one of a service name and a service identifier. The at least one identifier may be implemented in various forms, such as a list, a table, a file, etc. The control information based on at least a part of the identifier may include configuration information transmitted by the external server 450. According to various embodiments of the disclosure, the processor 330 may transmit a signal requesting activation of at least one service of services corresponding to the received service identifier to the external server 450. The external server 450 may receive the service activation request signal transmitted by the electronic device 300, and may activate a service corresponding to the activation request signal. The processor 330 may control the external electronic device 400 to activate the service corresponding to the received service identifier.

According to various embodiments of the disclosure, the external server 450 may transmit configuration for using the service after the service activation, to the electronic device 300. The processor 330 may activate the service using the received configuration so that the external electronic device 400 can use the service. For example, the processor 330 may activate the service in a manner that sets the profile stored in the external electronic device 400, based on the configuration information.

According to another embodiment, when the configuration information is transmitted to the external server 450, the external server 450 may transmit the configuration information to the electronic device 300. For example, the external server 450 may determine whether the users of the electronic device 300 and the external electronic device 400 are the same and whether the one-number service operated based on the same number is available by the electronic device 300 and the external electronic device 400. The external server 450 may activate the one-number service based on the determination result, and may transmit configuration information on the one-number service to the electronic device 300. The processor 330 may control the external electronic device 400 to activate the one-number service using the received configuration information.

According to various embodiments of the disclosure, the configuration information may not be transmitted from the external server 400 but may be stored in advance in the memory 340. The processor 330 may receive the identifier corresponding to the at least one service from the external server 400, and may transmit a service activation request to the external server 400. The processor 330 may invoke the configuration information corresponding to the identifier from the memory 340 in response to reception of a response message to the service activation request by the external server 400.

According to various embodiments of the disclosure, the processor 330 may transmit, to the external electronic device 400, configuration information that is used for the external electronic device 400 to activate a first function associated with the at least one service or to deactivate a second function associated with the at least one service, as a part of the control information. For example, the processor 330 may determine whether the one-number service is activated by the external electronic device 400. The processor 330 may control the external electronic device 400 to deactivate an automatic phone forwarding function in response to the determination result indicating that the one-number service has been activated, or may transmit a deactivation request signal to the external electronic device 400.

By way of another example, the processor 330 may control the external electronic device 400 to activate an automatic cellular modem activation/deactivation function according to whether a connection between the external electronic device 400 and the electronic device 300 using a short-distance communication means is established, in response to the determination result indicating that the one-number service has been activated.

According to various embodiments of the disclosure, the processor 330 may receive a designated application corresponding to at least one service from the external server 400. The designated application may be various applications required to use the at least one service. The processor 330 may transmit the designated application received from the external server 400, to the external electronic device 400. The external electronic device 400 may use the at least one service using the received application.

The memory 340 may store device information corresponding to the electronic device 300. The device information corresponding to the electronic device 300 may refer to identification information (e.g., which may include various information capable of distinguishing the electronic device 300 from other electronic devices, such as IMSI, MAC address, etc., of the electronic device 300) of the electronic device 300. According to various embodiments of the disclosure, the device information corresponding to the electronic device 300 may be transmitted to the external server 450, and the external server 450 may retrieve services available to the external electronic device 450 using the device information corresponding to the electronic device 300.

According to various embodiments of the disclosure, the memory 340 may include a database manager 341 configured to manage various data (e.g., the device information of the electronic device 300) stored in the memory 340, a device management application 343 configured to perform the function of various external electronic devices (e.g., the external electronic device 400 of FIG. 3) connected to the electronic device 300, and an information exchange application 345 configured to perform an operation of transmitting/receiving data to and from the various external electronic devices (e.g., the external electronic device 400 of FIG. 3) connected to the electronic device 300. The database manager 341, the device management application 343, or the information exchange application 345 may be included in a program module (e.g., the program 140 of FIG. 1), and may include at least one instruction so that the instructions may be loaded into the processor 330 to perform a designated operation.

Figure 4B:
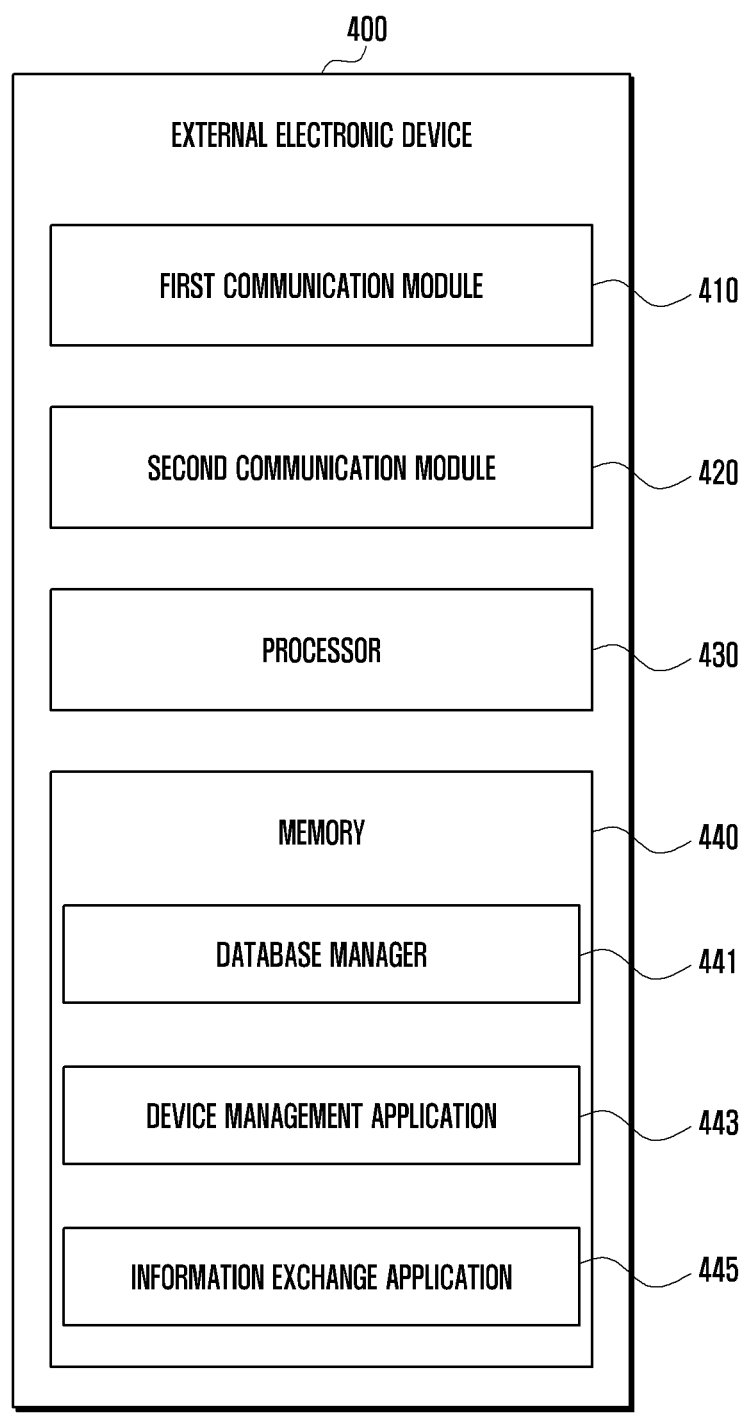
FIG. 4B is a block diagram illustrating an external electronic device according to various embodiments of the disclosure.

FIG. 4B is a block diagram illustrating the external electronic device 400 according to various embodiments of the disclosure.

Referring to FIG. 4B, the external electronic device 400 according to various embodiments of the disclosure may include a first communication module (e.g., including communication circuitry) 410, a second communication module (e.g., including communication circuitry) 420, a processor (e.g., including processing circuitry) 430, and a memory 440.

According to various embodiments of the disclosure, the first communication module 410 may include various communication circuitry and establish a first communication connection corresponding to a first communication method (e.g., a cellular network, Wi-Fi, or the like) with an external server (e.g., the external server 450 of FIG. 3).

According to various embodiments of the disclosure, the second communication module 420 may include various communication circuitry and establish a second communication connection corresponding to a second communication method (e.g., a short-distance communication method such as Bluetooth, NFC, Wi-Fi direct, or the like) with an electronic device (e.g., the electronic device 300 of FIG. 3).

The processor 430 may include various processing circuitry and establish the first communication connection with the external server 450 using the first communication module 410, and may transmit device information of the external electronic device 400 directly to the external server 450. The device information of the external electronic device 400 may be used to retrieve services available to the external electronic device 400 in the external server 450. The device information of the external electronic device 400 may include identification information (e.g., which may include various information capable of distinguishing the external electronic device 400 from other electronic devices, such as IMSI, MAC address, etc., of the external electronic device 400) of the external electronic device 400.

According to various embodiments of the disclosure, the external server 450 may retrieve services available to the external electronic device 400 based on the device information transmitted by the external electronic device 400, and may transmit at least one service identifier available to the external electronic device 400 to the external electronic device 400.

The processor 400 may receive the service identifier transmitted by the external server 450, and may transmit an activation request signal based on the identifier corresponding to the service to the external server 450. The external server 450 may perform activation of the service corresponding to the activation request signal in response to the reception of the activation request signal.

According to various embodiments of the disclosure, the processor 400 may be connected to the electronic device 300 using the second communication method. The processor 400 may receive a profile transmitted by the electronic device 300, and may install the profile on a UICC. The processor 400 may receive the service activation request signal transmitted by the electronic device 300, and may perform at least a part of a service activation operation using configuration information.

According to various embodiments of the disclosure, the memory 440 may include a database manager 441 configured to manage various data (e.g., device information of the external electronic device 400) stored in the memory 440, a device management application 443 configured to perform the functions of various electronic devices (e.g., the electronic device 300 of FIG. 3) connected to the external electronic device 400, and an information exchange application 445 configured to control an operation of transmitting/receiving data to and from the various external electronic devices (e.g., the electronic device 300 of FIG. 3) connected to the external electronic device 400.

The database manager 441, the device management application 443, or the information exchange application 445 may be included in a program module (e.g., the program 140 of FIG. 1), and may include at least one instruction so that the instructions may be loaded into the processor 400 to perform a designated operation.

Figure 4C:
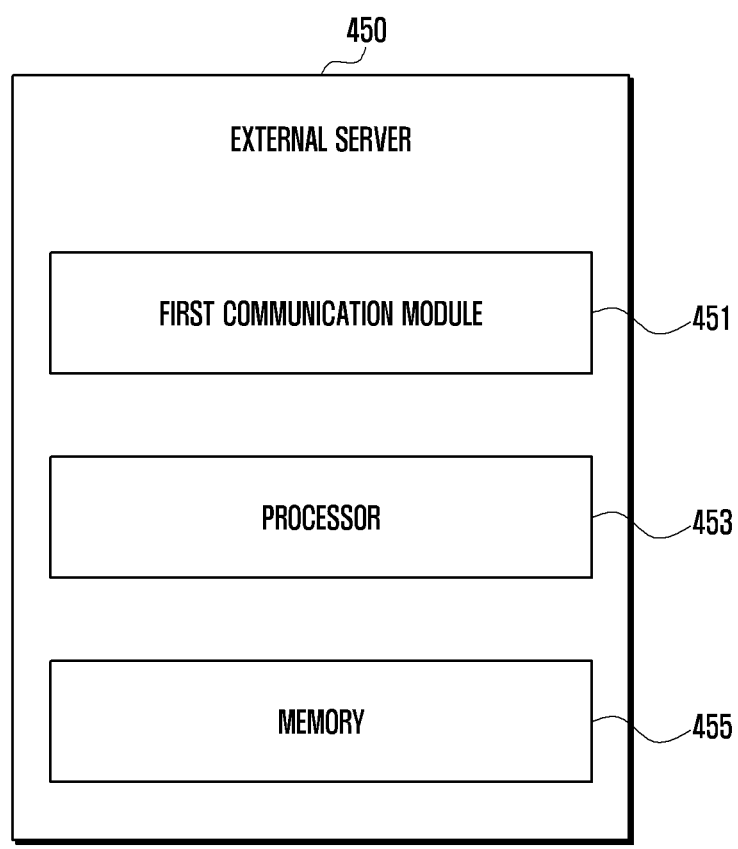
FIG. 4C is a block diagram illustrating an external server according to various embodiments of the disclosure.

FIG. 4C is a block diagram illustrating the external server 450 according to various embodiments of the disclosure.

Referring to FIG. 4C, the external server 450 according to various embodiments of the disclosure may include a first communication module (e.g., including communication circuitry) 451, a processor (e.g., including processing circuitry) 453, and a memory 455.

The first communication module 451 may include various communication circuitry and establish a first communication connection corresponding to a first communication method (e.g., a cellular network or the like) with an electronic device (e.g., the electronic device 300 of FIG. 3).

The processor 453 may include various processing circuitry and establish a communication connection with the electronic device 300 or the external electronic device 400 using the first communication module 451. According to various embodiments of the disclosure, the processor 453 may control the first communication module 451 to establish a communication connection with the electronic device 300, in response to reception of a signal requesting a communication connection transmitted by the electronic device 300.

According to various embodiments of the disclosure, the processor 453 may receive device information of the electronic device 300 transmitted by the electronic device 300. The processor 453 may retrieve communication services available to an external electronic device (e.g., the external electronic device 400 of FIG. 3) connected to the electronic device 300 based on the device information of the electronic device 300, and may transmit identifiers of the communication services available to the external electronic device 400 to the electronic device 300.

According to various embodiments of the disclosure, the processor 453 may perform an activation operation of the communication service in response to reception of an activation request signal of the communication service transmitted by the electronic device 300. For example, the processor 453 may transmit configuration information associated with the communication service corresponding to the activation request signal to the electronic device 300. The configuration information associated with the communication service may be used for the electronic device 300 and the external electronic device 400 to activate the communication service.

According to various embodiments of the disclosure, the processor 453 may perform the activation operation of the communication service, in response to the reception of the communication service activation request signal transmitted by the external electronic device 400. For example, the processor 453 may transmit the configuration information associated with the communication service corresponding to the activation request signal to the external electronic device 400. The configuration information associated with the communication service may be used for the external electronic device 400 to activate the communication service.

According to various embodiments of the disclosure, the memory 455 may temporarily or non-temporarily store the device information of the electronic device 300 and the external electronic device 400, a list of at least one service available to the external electronic device 400, configuration information associated with the service, and the like.

Figure 5:
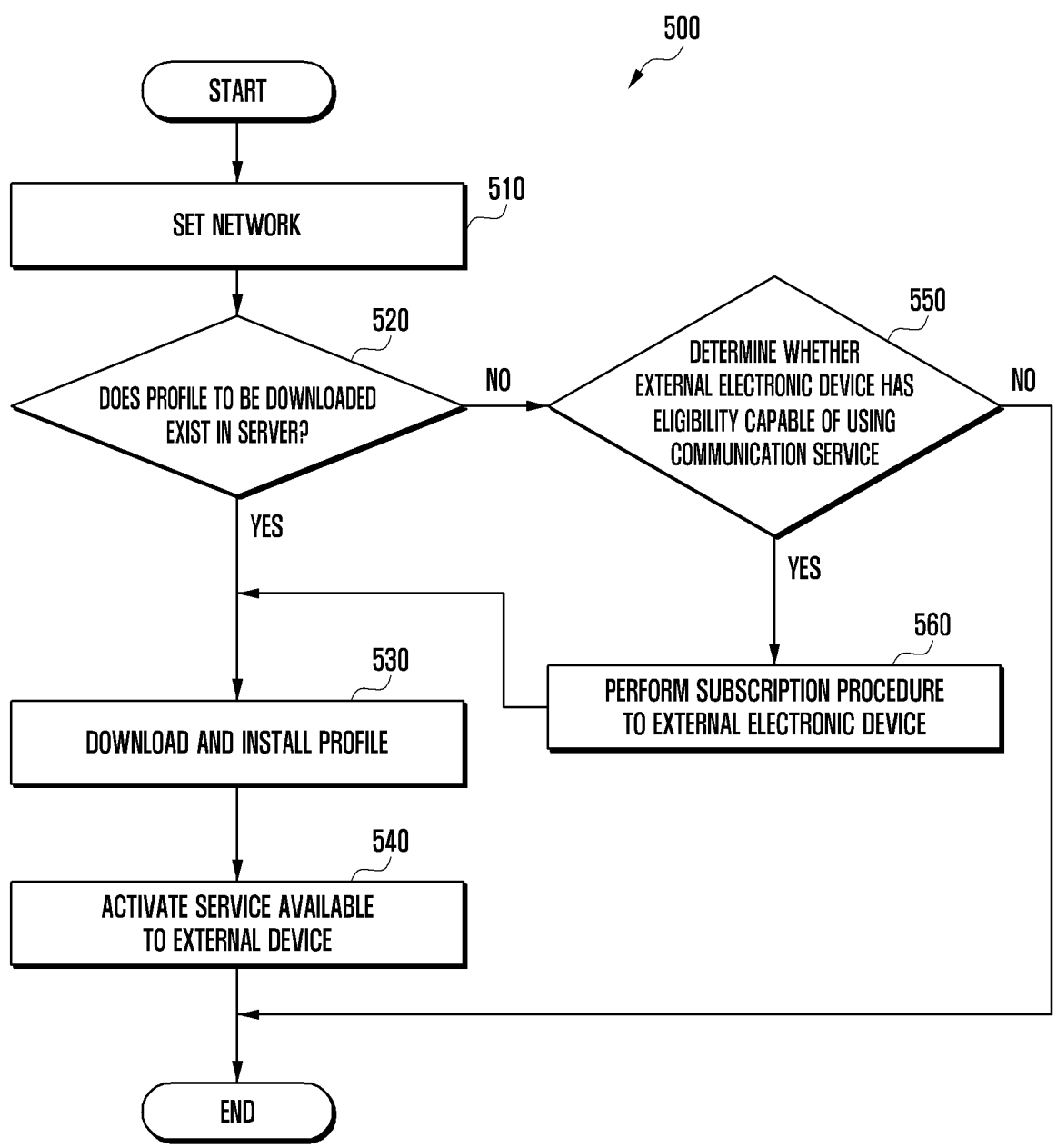
FIG. 5 is a flowchart illustrating profile downloading and installation on an external electronic device, in an electronic device according to various embodiments of the disclosure.

FIG. 5 is a flowchart 500 illustrating profile downloading and installation on an external electronic device, in an electronic device according to various embodiments of the disclosure.

Referring to FIG. 5, in operation 510, the processor 330 according to various embodiments of the disclosure may set a network that can be connected to the external server 450. According to various embodiments of the disclosure, the processor 330 may control the first communication module 310 for establishing the first communication connection corresponding to the first communication method (e.g., a cellular network, Wi-Fi, or the like) which may refer to a communication method capable of establishing a connection with the external server 450, thereby setting the network that can be connected to the external server 450.

In operation 520, the processor 330 according to various embodiments of the disclosure may determine whether a profile to be downloaded exists in the profile providing server. The processor 330 may search for the address of the profile providing server to determine whether the profile exists.

According to an embodiment, the processor 330 may make a connection to an address of a server included in a profile download address list stored in the external electronic device 400 in order to receive the profile, and may attempt to download the profile from the connected server if the connection is successful.

According to an embodiment, the processor 330 may make a connection to the address of the profile providing server included in the profile download address list stored in the external electronic device 400, and may attempt to make a connection to an address of a server included in a profile download address list stored in the electronic device 300 if the downloading of the profile fails. The processor 330 may attempt to download the profile from the connected profile providing server if the connection is successful.

According to an embodiment, the processor 330 may make a connection to the address of the profile providing server included in the profile download address list stored in the electronic device 300, and may verify an MCC of the external electronic device 400 if the downloading of the profile fails. The processor 330 may attempt to make a connection to an address of a profile providing server of at least one carrier corresponding to the MCC, and may attempt to download the profile from the connected profile providing server.

In operation 530, the processor 330 according to various embodiments of the disclosure may download and install the profile if the profile to be downloaded exists ('Yes' of operation 520). The processor 330 may receive the profile from the profile providing server. The processor 330 may transmit the received profile to the external electronic device 400. The external electronic device 400 may perform an operation of installing the profile transmitted by the processor 330 on the UICC of the external electronic device 400.

In operation 540, the processor 330 according to various embodiments of the disclosure may activate services available to the external electronic device 400. According to various embodiments of the disclosure, the processor 330 may transmit device information of the electronic device 300 to the external server 450, and may request a service identifier available to the external electronic device 400 from the external server 450. The external server 450 may transmit at least one identifier corresponding to the services available to the external electronic device 400 to the electronic device 300. The processor 330 may transmit a service activation request signal requesting activation of at least one of the services available to the external electronic device 400, to the external server 450. The external server 450 may transmit configuration information associated with the corresponding service to the electronic device 300 in response to reception of the service activation request signal. The processor 330 may activate the services available to the external electronic device 400 using the configuration information transmitted by the external server 450. Alternatively, the processor 330 may activate the services available to the external electronic device 400 using the configuration information corresponding to the identifier of the service to be activated among the configuration information stored in a memory (e.g., the memory 340 of FIG. 4A).

According to various embodiments of the disclosure, when receiving an indication that the profile to be downloaded does not exist in the profile providing server, the processor 330 may transmit an eligibility verification request message to the external server 450. The processor 330 may receive, from the profile providing server, the indication that the profile to be downloaded does not exist in the profile providing server. The processor 330 may determine that the profile does not exist in the profile providing server, in response to reception of the indication that the profile to be downloaded does not exist in the profile providing server.

In operation 550, the external server 450 according to various embodiments of the disclosure may determine whether the communication service used by the user of the electronic device 300 has eligibility available to the external electronic device 400 if the profile to be downloaded does not exist ('No' of operation 520). For example, the eligibility available to the external electronic device 400 may refer to eligibility associated with whether the communication service used by the user of the electronic device 300 can be simultaneously used by the external electronic device 400 or eligibility associated with whether the external electronic device 400 alone can use the communication service.

In operation 560, the external server 450 according to various embodiments of the disclosure may perform a communication service subscription procedure, in response to determining that the communication service used by the user of the electronic device 300 has eligibility available to the external electronic device 400 ('Yes' of operation 550). For example, the external server 450 may transmit a web address for communication service subscription to the electronic device 300. According to various embodiments of the disclosure, the processor 330 may display a communication service subscription page for communication service subscription on a display. The electronic device 300 and the external server 450 may perform a series of operations for communication service subscription to the external electronic device 400, and may download and install the profile, which are described in operation 530.

Figure 6:
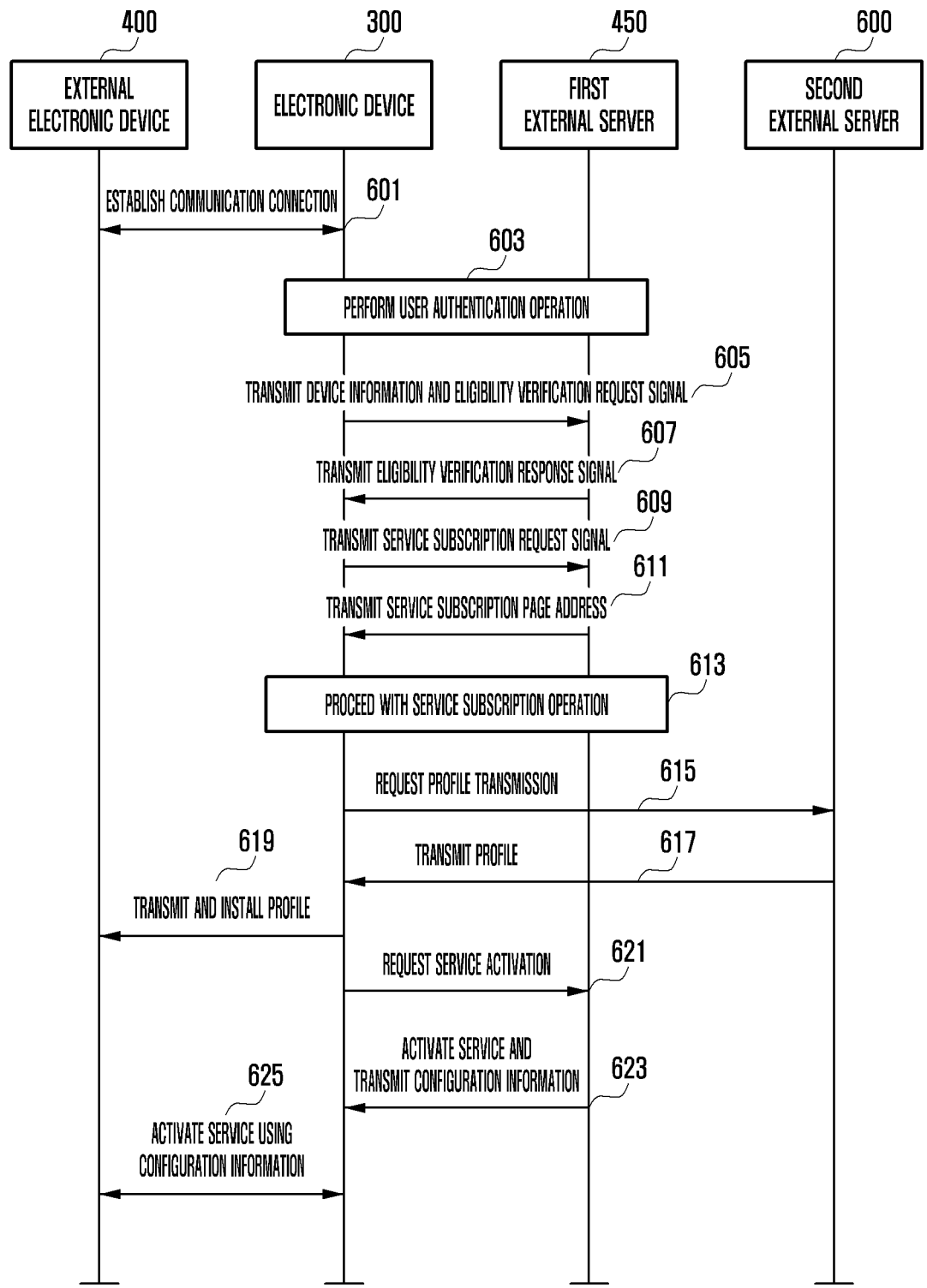
FIGS. 6, 7 and 8 are flowcharts illustrating an operation of downloading a profile and installing a profile on an external electronic device, in an electronic device according to various embodiments of the disclosure.
Figure 7:
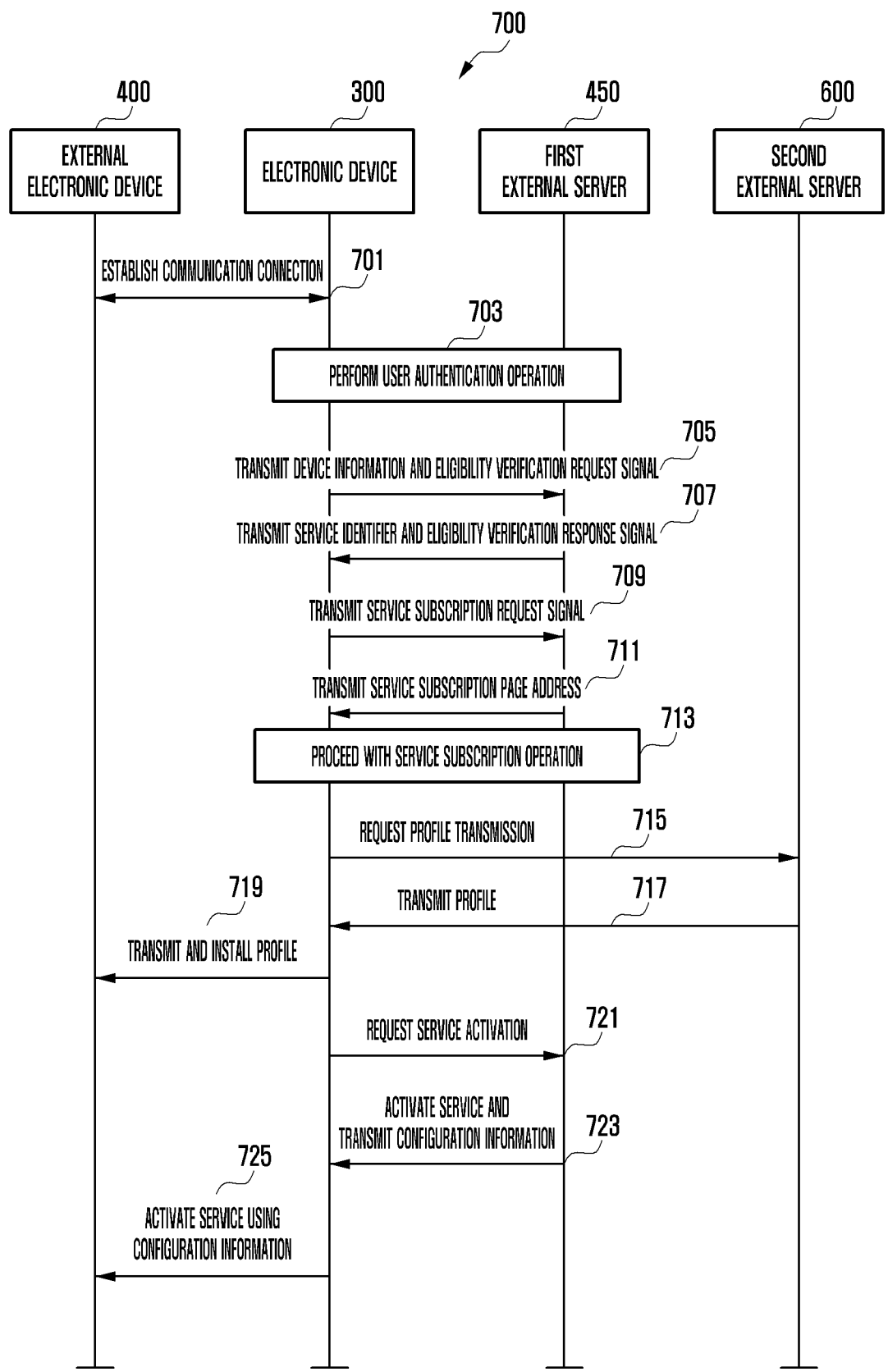
Figure 8:
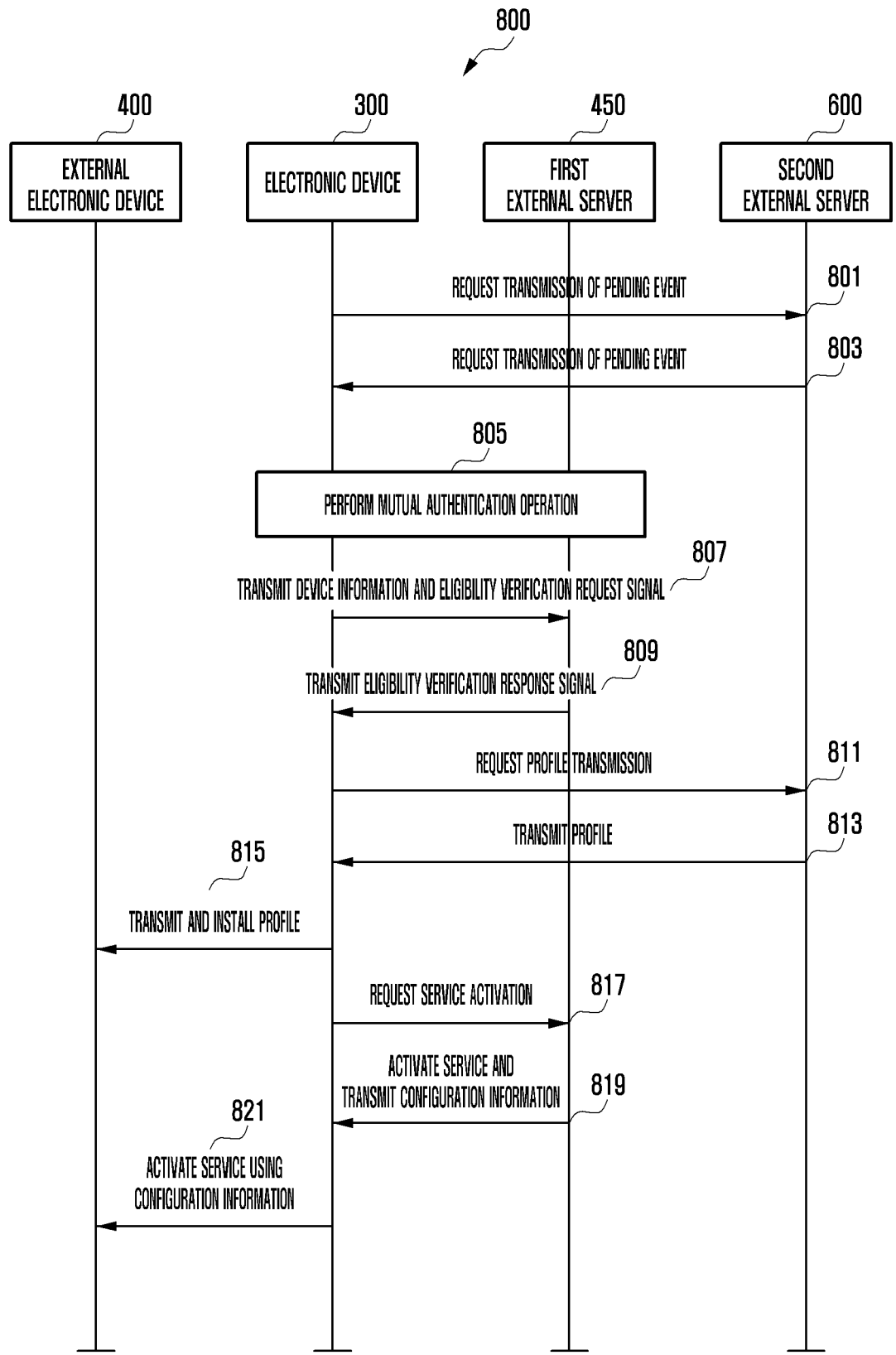

FIGS. 6, 7 and 8 are flowcharts illustrating an operation of downloading a profile and installing a profile on an external electronic device, in an electronic device according to various embodiments of the disclosure.

Referring to FIGS. 6, 7 and 8, various operations for installing a profile on the external electronic device 400 among an electronic device (e.g., the electronic device 300 of FIG. 3), a first external server (e.g., the external server 450 of FIG. 3), an external electronic device (e.g., the external electronic device 400 of FIG. 3), and a second external server 600 are illustrated. The second external server 600 may refer to a profile providing server providing a profile to be installed in the external electronic device 400.

FIG. 6 is a flowchart illustrating a first example 600 of downloading a profile and installing the profile on an external electronic device, in an electronic device according to various embodiments of the disclosure.

Referring to FIG. 6, in operation 601, the electronic device 300 and the external electronic device 400 may perform a communication connection for interconnection through various communication means. According to various embodiments of the disclosure, the electronic device 300 and the external electronic device 400 may perform interconnection using a short-distance communication means (e.g., Bluetooth, NFC, or the like).

In operation 603, the electronic device 300 may perform a user authentication operation with the first external server 450. According to various embodiments of the disclosure, user authentication between the electronic device 300 and the first external server 450 may use an authentication method defined in 3GPP, OAuth, or the like, but there is no limitation on the authentication method.

In operation 605, the electronic device 300 may transmit device information and an eligibility verification request signal to the first external server 450.

According to various embodiments of the disclosure, the electronic device 300 may generate a token for communicating with the first external server 450. The generated token may be used for communication between the electronic device 300 and the first external server 450 performed for communication service subscription of the external electronic device 400.

According to various embodiments of the disclosure, the electronic device 300 may transmit device information of the electronic device 300 for a procedure of verifying a communication service eligibility of the electronic device 300 performed by the first external server 450. The device information of the electronic device 300 may include identification information of the electronic device 300. The identification information may include various information capable of distinguishing the electronic device 300 from other electronic devices, such as an IMSI of the electronic device 300, an MAC address of the electronic device 300, a serial number defined by the manufacturer of the electronic device 300, and the like.

The first external server 450 may verify the eligibility of the electronic device 300, using the identification information of the electronic device 300 transmitted by the electronic device 300. The eligibility of the electronic device 300 may include eligibility that a communication service plan of the electronic device 300 can support the communication service of the external electronic device 400.

In operation 607, the first external server 450 may transmit an eligibility verification response signal to the electronic device 300. The eligibility verification response signal may include a result obtained by verifying the eligibility capable of supporting the communication service of the external electronic device 400, which has been verified by the first external server 450.

In operation 609, the electronic device 300 may transmit a communication service subscription request signal to the first external server 450. The communication service subscription request signal may refer to a signal for requesting subscription to the communication service in which the external electronic device 400 performs communication using a cellular network.

According to various embodiments of the disclosure, the communication service subscription request signal may include a signal for requesting a webpage address capable of inputting terms for using the communication service and whether a user agrees with the terms. The electronic device 300 may transmit identification information (e.g., IMSI of the external electronic device 400) of the external electronic device 400 together with the communication service subscription request signal.

In operation 611, the first external server 450 may transmit the web or page address for communication service subscription to the electronic device 300.

In operation 613, the first external server 450 and the electronic device 300 may proceed with a communication service subscription operation of the external electronic device 400.

According to various embodiments of the disclosure, the first external server 450 may transmit the web address capable of inputting terms for using the communication service and whether a user agrees with the terms, to the electronic device 300. If there is input data on the terms for the user to use the communication service and whether the user agrees with the terms, the first external server 450 may not transmit the web address capable of inputting terms for using the communication service and whether the user agrees with the terms.

According to various embodiments of the disclosure, the electronic device 300 may transmit a request signal for selecting a plan for the communication service to the first external server 450. The first external server 450 may transmit various plan information provided for the communication service to the electronic device 300. The electronic device 300 may output the plan information on the display, may receive a user input for selecting the plan, and may transmit the user input to the first external server 450.

According to various embodiments of the disclosure, the first external server 450 may transmit, to the second external server 600, a signal requesting the generation of the profile to be installed in the external electronic device 400, in response to completion of the subscription procedure of the communication service used by the external electronic device 400. The second external server 600 may receive the signal requesting the generation of the profile and may generate the profile of the external electronic device 400.

In operation 615, the electronic device 300 may transmit a profile transmission request signal requesting the transmission of the profile, to the second external server 600. In operation 617, the second external server 600 may transmit the generated profile to the electronic device 300.

In operation 619, the electronic device 300 and the external electronic device 400 may perform at least a part of an operation of installing the downloaded profile. The operation of installing the profile in the external electronic device 400 may be performed according to the standard specification defined in GSMA SGP. 22.

According to various embodiments of the disclosure, the electronic device 300 may install the profile in the UICC included in the external electronic device 400. For example, the profile may be received as a profile package in an encrypted form. The electronic device 300 may perform a decryption operation on the encrypted profile package and may install the profile on the UICC included in the external electronic device 400 using the decrypted profile package. A process of installing the profile may be performed using OTA technology. An encryption key used for encryption and decryption may be an encryption key generated through mutual authentication between the electronic device 300 and the second external server 600. The encryption method may follow the standard specification defined in GSMA SGP. 22, and there is no limitation to this.

In operation 621, the electronic device 300 may transmit a signal requesting service activation to the first external server 450. According to various embodiments of the disclosure, the service may refer to various communication services using a cellular network provided by a communication service provider of the external electronic device 400. The electronic device 300 may request transmission of configuration information required to use the service while transmitting the signal requesting the service activation to the first external server 450.

In operation 623, the first external server 450 may perform service activation and may transmit configuration information associated with the activated service to the electronic device 300.

According to various embodiments of the disclosure, the electronic device 300 may store configuration information associated with the service available to the external electronic device 500 in the memory 340 in advance. When the configuration information is stored in the memory 340, the electronic device 300 may not request the transmission of the configuration information from the external server 450. When the configuration information is stored in the memory 340, the electronic device 300 may invoke, from the memory 340, configuration information corresponding to an identifier of the service to be activated, and then may use the invoked configuration information.

In operation 625, the external electronic device 400 and the electronic device 300 may perform service activation using the configuration information.

According to various embodiments of the disclosure, the external server 450 may activate the corresponding service, and then may transmit the configuration information for using the service to the electronic device 300. The processor 330 may perform communication service activation using the received configuration information so that the external electronic device 400 can utilize the activated service. The external electronic device 400 may perform communication service activation using the configuration information transmitted by the processor 330.

According to various embodiments of the disclosure, the services may include one-number services in which a plurality of electronic devices (e.g., the electronic device 300 and the external electronic device 400) transmits and receives a call based on the same phone number, automatic phone forwarding services which are automatically forwarded to other electronic devices if there is no response in a situation where a call is received at one of the plurality of electronic devices (e.g., the electronic device 300 and the external electronic device 400), cellular modem ON/OFF services for automatically activating/deactivating a modem using a cellular communication, message sync services or telephone history sync services for synchronizing message and telephone transmission/reception histories between the plurality of electronic devices (e.g., the electronic device 300 and the external electronic device 400), and the like.

For example, the first external server 450 may determine whether the users of the electronic device 300 and the external electronic device 400 are the same and whether the electronic device 300 and the external electronic device 400 can be operated with the same number. The first external server 450 may activate the one-number service based on the determination result, and may transmit configuration information on the one-number service to the electronic device 300. The processor 330 may activate the communication service available to the external electronic device 400 using the received configuration information. Alternatively, the external electronic device 400 may activate the communication service using the configuration information transmitted by the processor 330.

By way of another example, the electronic device 300 may determine whether the one-number service is activated by the external electronic device 400, based on device information of the external electronic device 400. The electronic device 300 may transmit configuration information for deactivating an automatic phone forwarding function to the external electronic device 400, in response to the determination result indicating that the one-number service is activated.

By way of another example, the electronic device 300 may determine whether the one-number service is activated by the external electronic device 400, based on the device information of the external electronic device 400. The electronic device 300 may activate an automatic cellular modem activation/deactivation function according to whether a connection between the external electronic device 400 and the electronic device 300 is established using a short-distance communication means, in response to the determination result indicating that the one-number service is activated.

According to various embodiments of the disclosure, the configuration information may be requested and received even in the service subscription proceeding operation (operation 613) other than operations 621 and 623. In this case, the configuration information may be used in the profile installation operation (operation 619).

According to various embodiments of the disclosure, the installation of the profile in operation 619 may be performed under the control of the electronic device 300, but is not limited thereto. The external electronic device 400 may receive the profile from the electronic device 300 and may install the profile itself without the control of the electronic device 300.

According to various embodiments of the disclosure, the service activation of operation 625 may be performed under the control of the electronic device 300, but is not limited thereto. The external electronic device 400 may receive the configuration information associated with the service activation, and may perform the service activation operation itself without the control of the electronic device 300.

Although not shown in FIG. 6, after operation 625, the first external server 450 may request transmission of an indication indicating whether the communication service of the external electronic device 500 is activated, from the electronic device 400.

FIG. 7 is a flowchart 700 illustrating a second embodiment of downloading a profile and installing the profile on an external electronic device, in an electronic device according to various embodiments of the disclosure.

Referring to FIG. 7, in operation 701, the electronic device 300 and the external electronic device 400 may establish a communication connection to perform interconnection through various communication means. According to various embodiments of the disclosure, the electronic device 300 and the external electronic device 400 may perform interconnection using a short-distance communication means (e.g., Bluetooth, NFC, or the like).

In operation 703, the electronic device 300 may perform user authentication with the first external server 450.

According to various embodiments of the disclosure, user authentication between the electronic device 300 and the first external server 450 may use an authentication method defined in 3GPP, OAuth, or the like, but there is no limitation on the authentication method.

In operation 705, the electronic device 300 may transmit device information of the electronic device 300 and an eligibility verification request signal to the first external server 450.

According to various embodiments of the disclosure, the electronic device 300 may generate a token for communicating with the first external server 450. The generated token may be used for communication between the electronic device 300 and the first external server 450 performed for communication service subscription of the external electronic device 400.

According to various embodiments of the disclosure, the electronic device 300 may transmit identification information of the electronic device 300 for a procedure of verifying a communication service eligibility of the electronic device 300 performed by the first external server 450. The identifier may be an IMSI of the electronic device 300, an MAC address of the electronic device 300, a serial number defined by the manufacturer of the electronic device 300, or the like, but is not limited thereto.

The first external server 450 may verify the eligibility of the electronic device 300, using the identification information of the electronic device 300 transmitted by the electronic device 300. The eligibility of the electronic device 300 may include eligibility that a communication service plan of the electronic device 300 can support the communication service of the external electronic device 400.

In operation 707, the first external server 450 may transmit an eligibility verification response signal to the electronic device 300. The eligibility verification response signal may include a result obtained by verifying the eligibility capable of supporting the communication service of the external electronic device 400, which has been verified by the first external server 450, and a communication service identifier.

In operation 721, the communication service according to various embodiments of the disclosure may refer to various communication services (e.g., one-number service, etc.) using a cellular network provided by a communication service provider of the external electronic device 400.

In operation 709, the electronic device 300 may transmit a communication service subscription request signal to the first external server 450. The communication service subscription request signal may refer to a signal for requesting subscription to the communication service in which the external electronic device 400 performs communication using a cellular network.

According to various embodiments of the disclosure, the communication service subscription request signal may include a signal for requesting a webpage page address capable of inputting terms for using the communication service and whether a user agrees with the terms. The electronic device 300 may transmit identification information (e.g., IMSI of the external electronic device 400) of the external electronic device 400 together with the communication service subscription request signal.

According to various embodiments of the disclosure, the electronic device 300 may retrieve the address of the second external server 600 to download the profile and may attempt to download the profile by making a connection to the retrieved address. If a profile to be downloaded exists in the second external server 600, the profile may be downloaded.

According to various embodiments of the disclosure, if the profile to be downloaded does not exist, operations prior to operation 711 may be performed.

In operation 711, the first external server 450 may transmit the web or page address for communication service subscription to the electronic device 300.

In operation 713, the first external server 450 and the electronic device 300 may proceed with a communication service subscription operation of the external electronic device 400.

According to various embodiments of the disclosure, the first external server 450 may transmit the web address capable of inputting the terms for using the communication service and whether a user agrees with the terms, to the electronic device 300. If there is input data on the terms for the user to use the communication service and whether the user agrees with the terms, the first external server 450 may not transmit the web address capable of inputting the terms for using the communication service and whether the user agrees with the terms.

According to various embodiments of the disclosure, the electronic device 300 may transmit a request signal for selecting a plan for the communication service to the first external server 450. The first external server 450 may transmit various plan information provided for the communication service to the electronic device 300. The electronic device 300 may output the plan information on the display, may receive a user input for selecting the plan, and may transmit the user input to the first external server 450.

According to various embodiments of the disclosure, the first external server 450 may transmit, to the second external server 600, a signal requesting the generation of the profile to be installed in the external electronic device 400, in response to completion of the subscription procedure of the communication service used by the external electronic device 400. The second external server 600 may receive the signal requesting the generation of the profile and may generate the profile of the external electronic device 400.

In operation 715, the electronic device 300 may transmit a profile transmission request signal requesting the transmission of the profile, to the second external server 600. In operation 717, the second external server 600 may transmit the generated profile to the electronic device 300.

In operation 719, the electronic device 300 and the external electronic device 400 may perform a series of operations of installing the downloaded profile.

According to various embodiments of the disclosure, the electronic device 300 may install the profile in the UICC included in the external electronic device 400. For example, the profile may be received as a profile package in an encrypted form. The electronic device 300 may perform a decryption operation on the encrypted profile package and may install the profile on the UICC included in the external electronic device 400 using the decrypted profile package. A process of installing the profile may be performed using OTA technology. An encryption key used for encryption and decryption may be an encryption key generated through mutual authentication between the electronic device 300 and the second external server 600. The encryption method may follow the standard specification defined in GSMA SGP. 22, and there is no limitation to this.

In operation 721, the electronic device 300 may transmit a signal requesting service activation to the first external server 450. The electronic device 300 may request transmission of configuration information required to use the service while transmitting the signal requesting the service activation to the first external server 450.

In operation 723, the first external server 450 may perform service activation and may transmit configuration information associated with the activated service to the electronic device 300.

In operation 725, the external electronic device 400 and the electronic device 300 may set the profile using the received configuration, and may perform service activation.

According to various embodiments of the disclosure, the external server 450 may activate the corresponding service, and then may transmit the configuration information for using the service to the electronic device 300. The processor 330 may set the profile stored in the external electronic device 400 using the received configuration information so that the external electronic device 400 can use the activated service.

According to various embodiments of the disclosure, the communication services may include one-number services in which a plurality of electronic devices (e.g., the electronic device 300 and the external electronic device 400) transmits and receives a call based on the same phone number, automatic phone forwarding services which are automatically forwarded to other electronic devices if there is no response in a situation where a call is received at one of the plurality of electronic devices (e.g., the electronic device 300 and the external electronic device 400), cellular modem ON/OFF services for automatically activating/deactivating a modem using a cellular communication, message sync services or telephone history sync services for synchronizing message and telephone transmission/reception histories between the plurality of electronic devices (e.g., the electronic device 300 and the external electronic device 400), and the like.

For example, the first external server 450 may determine whether the users of the electronic device 300 and the external electronic device 400 are the same and whether the electronic device 300 and the external electronic device 400 can be operated with the same number. The first external server 450 may activate the one-number service based on the determination result, and may transmit configuration information on the one-number service to the electronic device 300. The processor 330 may set the profile stored in the external electronic device 400 using the received configuration information.

By way of another example, the first external server 450 may determine whether the one-number service is activated by the external electronic device 400, based on device information of the external electronic device 400. The first external server 450 may deactivate an automatic phone forwarding function, in response to the determination result indicating that the one-number service is activated.

By way of another example, the first external server 450 may determine whether the one-number service is activated by the external electronic device 400, based on device information of the external electronic device 400. The first external server 450 may activate an automatic cellular modem ON/OFF function according to whether a connection between the external electronic device 400 and the electronic device 300 is established using a short-distance communication means, in response to the determination result indicating that the one-number service is activated.

According to various embodiments of the disclosure, the configuration information may be requested and received even in the service subscription proceeding operation (operation 713) other than operations 721 and 723. In this case, the configuration information may be used in the profile installation operation (operation 719).

According to various embodiments of the disclosure, the installation of the profile in operation 719 may be performed under the control of the electronic device 300, but is not limited thereto. The external electronic device 400 may receive the profile from the electronic device 300 and may install the received profile.

According to various embodiments of the disclosure, the service activation of operation 731 may be performed under the control of the electronic device 300, but is not limited thereto. The external electronic device 400 may receive the configuration information associated with the service activation, and may perform the service activation operation itself without the control of the electronic device 300.

FIG. 8 is a flowchart 800 illustrating a third example embodiment of downloading a profile and installing the profile on an external electronic device, in an electronic device according to various embodiments of the disclosure.

The example shown in FIG. 8 relates to an embodiment of installing a profile when a communication service subscription procedure for the external electronic device 400 is completed by services (e.g., offline services provided by an offline store such as a communication service distributor or the like) provided by a communication service provider. When the communication service subscription to the external electronic device 400 is completed, a profile that can be installed in the external electronic device 400 may be stored in the second external server 600 in advance.

Referring to FIG. 8, in operation 801, the electronic device 300 according to various embodiments may transmit a request signal requesting transmission of event-related data pending to the second external server 600. The pending event-related data may refer to event-related data associated with the communication service subscription of the external electronic device 400.

In operation 803, the second external server 600 according to various embodiments of the disclosure may transmit the pending event-related data to the electronic device 300.

In operation 805, the electronic device 300 and the first external server 450 according to various embodiments of the disclosure may perform mutual authentication. In operation 807, the electronic device 300 according to various embodiments of the disclosure may transmit device information of the electronic device 300 and an eligibility verification request signal to the first external server 450.

According to various embodiments of the disclosure, the eligibility verification request signal may refer to a verification request for whether the communication service plan of the electronic device 300 has eligibility capable of supporting the communication service of the external electronic device 400. The electronic device 300 may transmit an identifier of the electronic device 300 and an identifier of the external electronic device 400 together with the eligibility verification request signal.

According to various embodiments of the disclosure, in operation 807, the first external server 450 may transmit an eligibility verification response signal to the electronic device 300. The eligibility verification response signal may include a result obtained by verifying the eligibility capable of supporting the communication service of the external electronic device 400, which has been verified by the first external server 450.

According to various embodiments of the disclosure, the communication service subscription procedure of the external electronic device 400 may be already completed. Accordingly, the first external server 450 may confirm that the communication service of the electronic device 300 can support the communication service of the external electronic device 400, and may transmit the eligibility verification response signal in operation 809.

In operation 811, the electronic device 300 according to various embodiments of the disclosure may request transmission of the profile from the second external server 600. In operation 813, the second external server 600 may retrieve the profile of the external electronic device 400 and may transmit the retrieved profile to the electronic device 300, in response to the request of the electronic device 300.

In operation 815, the electronic device 300 and the external electronic device 400 according to various embodiments of the disclosure may install the received profile on the UICC of the external electronic device 400 using the received profile.

According to various embodiments of the disclosure, the electronic device 300 may install the profile on the UICC included in the external electronic device 400. For example, the profile may be received as a profile package in an encrypted form. The electronic device 300 may perform a decryption operation on the encrypted profile package and may install the profile on the UICC included in the external electronic device 400 using the decrypted profile package. A process of installing the profile may be performed using OTA technology. An encryption key used for encryption and decryption may be an encryption key generated through mutual authentication between the electronic device 300 and the second external server 600. The encryption method may follow the standard specification defined in GSMA SGP. 22, and there is no limitation to this.

In operation 817, the electronic device 300 according to various embodiments of the disclosure may transmit a signal requesting service activation to the first external server 450. According to various embodiments of the disclosure, the service may refer to a communication service using a cellular network provided by a communication service provider of the external electronic device 400. The electronic device 300 may request transmission of configuration information required to use the service while transmitting the signal requesting the service activation to the first external server 450.

In operation 819, the first external server 450 according to various embodiments of the disclosure may perform service activation and may transmit configuration information associated with the activated service to the electronic device 300.

In operation 821, the external electronic device 400 and the electronic device 300 according to various embodiments of the disclosure may set the profile using the received configuration information, and may perform service activation.

According to various embodiments of the disclosure, the external server 450 may activate the corresponding service, and then may transmit configuration information for using the service to the electronic device 300. The processor 330 may set the profile stored in the external electronic device 400 using the received configuration information so that the external electronic device 400 can use the activated service.

According to various embodiments of the disclosure, the installation of the profile of operation 815 may be performed under the control of the electronic device 300, but is not limited thereto. The external electronic device 400 may receive the profile from the electronic device 300 and may install the profile itself without the control of the electronic device 300.

According to various embodiments of the disclosure, the service activation of operation 821 may be performed under the control of the electronic device 300, but is not limited thereto. The external electronic device 400 may receive configuration information associated with service activation, and may perform service activation itself without the control of the electronic device 300.

Figure 9:
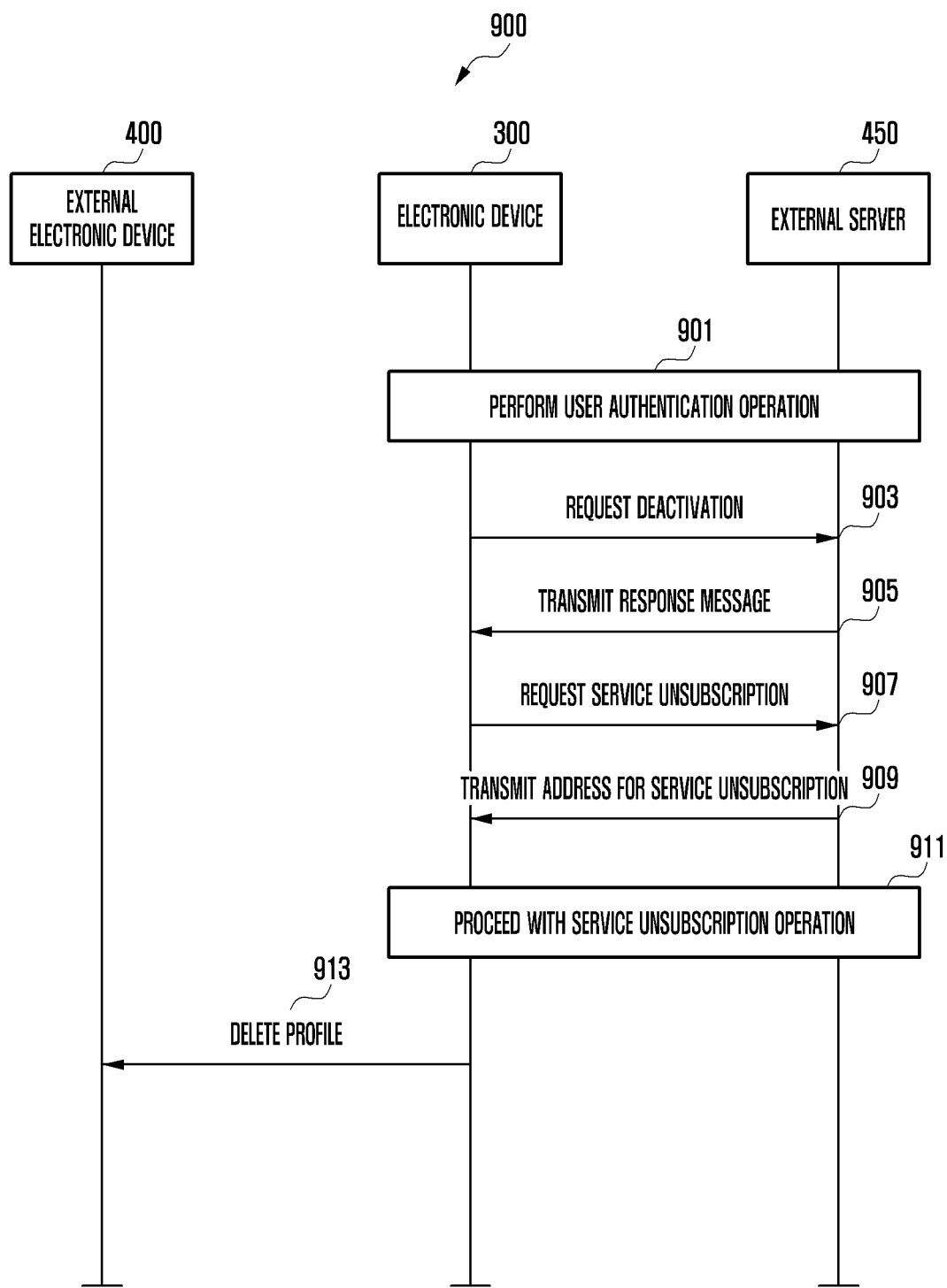
FIG. 9 is a flowchart illustrating an operation of performing communication service unsubscription using an electronic device according to various embodiments of the disclosure.

FIG. 9 is a flowchart 900 illustrating an operation of performing communication service unsubscription using an electronic device according to various embodiments of the disclosure.

Referring to FIG. 9, in operation 901, an electronic device (e.g., the electronic device 300 of FIG. 3) and an external server (e.g., the external server 450 of FIG. 3) may perform a user authentication operation. According to various embodiments of the disclosure, user authentication between the electronic device 300 and the first external server 450 may use an authentication method defined in 3GPP, OAuth, or the like, but there is no limitation on the authentication method.

In operation 903, the electronic device 300 according to various embodiments of the disclosure may request deactivation of the communication service available to the external electronic device 400. The deactivation of the communication service may refer to temporary/non-temporary disconnection of the communication service rather than communication service unsubscription.

In operation 905, the external server 450 may perform deactivation of the communication service, and may transmit a response message to the electronic device 300.

The electronic device 300 according to various embodiments of the disclosure may perform a communication service unsubscription operation after the deactivation of the communication service. The electronic device 300 according to various embodiments of the disclosure may proceed with a procedure for communication service unsubscription after the deactivation of the communication service.

In operation 907, the electronic device 300 according to various embodiments of the disclosure may request communication service unsubscription of the external electronic device 400 from the external server 450. In operation 909, the external server 450 may transmit an address capable of loading a webpage for service unsubscription to the electronic device 300.

In operation 911, the electronic device 300 according to various embodiments of the disclosure may output the received webpage on a display, and may perform the service unsubscription operation according to a user input on the display.

In operation 913, when the service unsubscription procedure according to various embodiments of the disclosure is completed, the electronic device 300 may control the external electronic device 400 to delete the profile stored in the UICC of the external electronic device 400. Alternatively, the external electronic device 400 may delete the profile alone, rather than the control of the electronic device 300.

Figure 10:
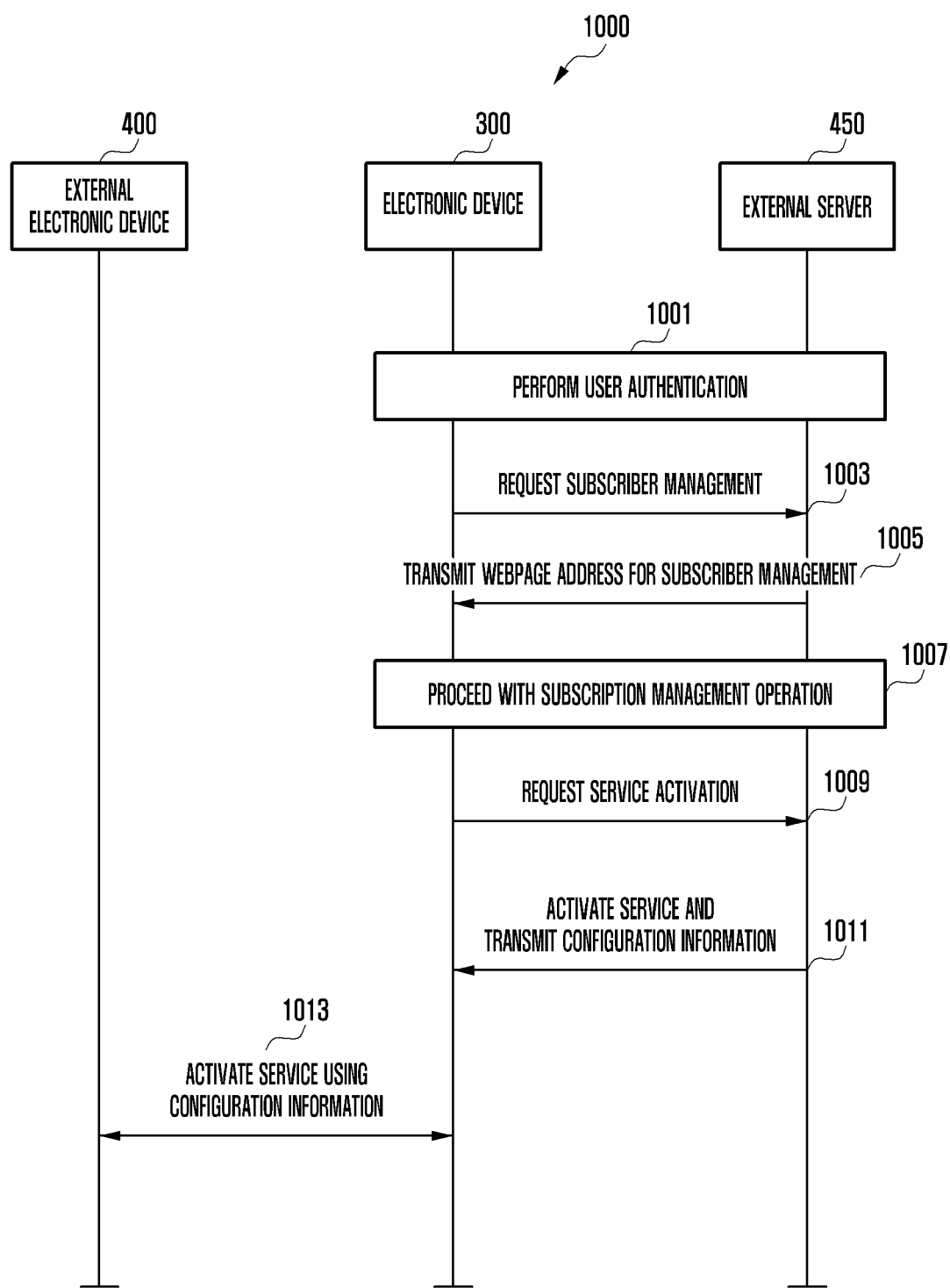
FIG. 10 is a flowchart illustrating an operation of managing a communication service using an electronic device according to various embodiments of the disclosure.

FIG. 10 is a flowchart 1000 illustrating an operation of managing a communication service using an electronic device according to various embodiments of the disclosure.

Referring to FIG. 10, in operation 1001, an electronic device (e.g., the electronic device 300 of FIG. 3) and an external server (e.g., the external server 450 of FIG. 3) according to various embodiments of the disclosure may first perform user authentication. According to various embodiments of the disclosure, user authentication between the electronic device 300 and the first external server 450 may use an authentication method defined in 3GPP, OAuth, or the like, but there is no limitation on the authentication method.

In operation 1003, the electronic device 300 according to various embodiments of the disclosure may transmit a signal requesting management of communication service subscription to the external server 450. The management of the communication service subscription may include a management procedure for changing the communication service, such as changing the plan of the communication service.

In operation 1005, the external server 450 according to various embodiments of the disclosure may transmit a web or webpage address for the management of the communication service of the external electronic device 400 to the electronic device 300.

In operation 1007, the electronic device 300 and the external server 450 according to various embodiments of the disclosure may proceed with the management procedure of the communication service subscription. According to various embodiments of the disclosure, the electronic device 300 may output the webpage received in operation 1005 on a display (e.g., the display device 160 of FIG. 1). The electronic device 300 may proceed with a subscription management procedure according to a user input to the webpage.

In operation 1009, the electronic device 300 may transmit an activation request signal requesting activation of the changed service to the external server 450, in response to completion of the subscription management procedure of the communication service.

In operation 1011, the external server 450 may perform activation of the changed service and may transmit configuration information associated with the changed service to the electronic device 300, in response to the reception of the activation request signal.

In operation 1013, the electronic device 300 and the external electronic device 400 may activate the corresponding service using the configuration information. According to various embodiments of the disclosure, the electronic device 300 and the external electronic device 400 may set the profile stored in the external electronic device 400 using the configuration information.

Figure 11:
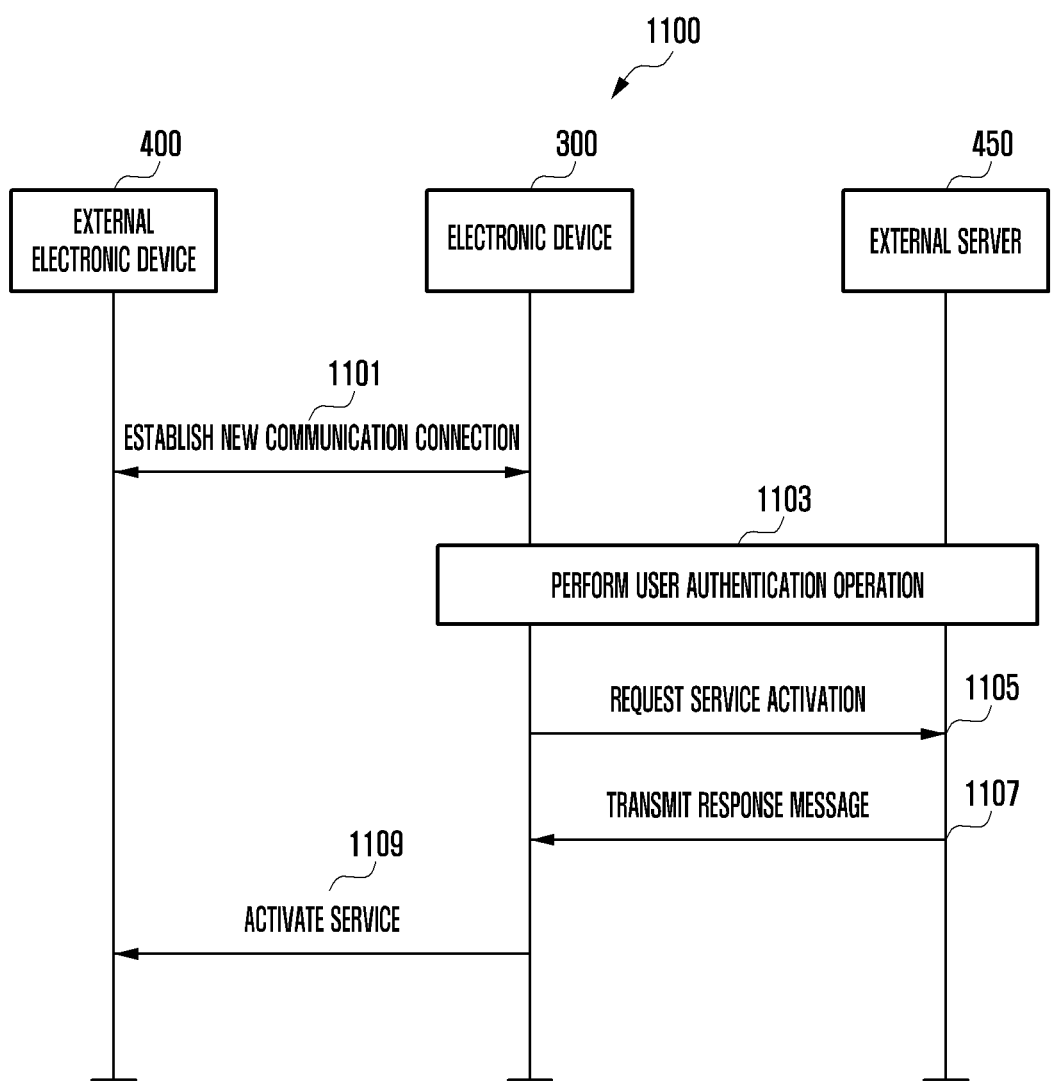
FIG. 11 is a flowchart illustrating an operation of activating a communication service when a profile of at least one of an electronic device and an external electronic device is changed, in an electronic device according to various embodiments of the disclosure.

FIG. 11 is a flowchart illustrating an operation of activating a communication service when a profile of at least one of the electronic device 300 and the external electronic device 400 is changed, in an electronic device according to various embodiments of the disclosure.

FIG. 11 illustrates an operation of activating the communication service when a profile of at least one of an electronic device and an external electronic device is changed, such as when the external electronic device 400 in which the profile is installed is connected to the electronic device 300 or when the profile installed in the electronic device 300 is changed due to a change in a communication company, or the like.

In operation 1101, the external electronic device 400 and the electronic device 300 may establish a communication connection. The electronic device 300 may establish a communication connection corresponding to a second communication method between the external electronic device 500 and the electronic device 300 using the second communication module 320. The second communication method may include a short-distance communication connection method between the external electronic device 400 and the electronic device 300.

According to the embodiment shown in FIG. 11, the external electronic device 400 and the electronic device 300 may be in a newly connected state. The case where the profile installed in the electronic device 300 is changed due to a change in the communication company or the like may correspond to a case where the external electronic device 400 in which the profile has been already installed is newly connected to the electronic device 300.

In operation 1103, the electronic device 300 and the external server 450 according to various embodiments of the disclosure may perform a user authentication operation. According to various embodiments of the disclosure, user authentication between the electronic device 300 and the first external server 450 may use an authentication method defined in 3GPP, OAuth, or the like, but there is no limitation on the authentication method.

In operation 1105, the electronic device 300 according to various embodiments of the disclosure may transmit a signal requesting service activation to the external server 450. According to various embodiments of the disclosure, the electronic device 300 may transmit device information of the electronic device 300 (e.g., IMSI of the electronic device 300) and device information of the external electronic device 400 (e.g., IMSI of the external electronic device 400) to the external server 450.

In operation 1107, the external server 450 according to various embodiments of the disclosure may transmit a response message to the service activation request to the electronic device 300. According to various embodiments of the disclosure, the external server 450 may transmit, to the electronic device 300, whether a service requested to be activated is valid using an identifier of the electronic device 300 and an identifier of the external electronic device 400 or service information to which the electronic device 300 is subscribed.

In operation 1109, the electronic device 300 according to various embodiments of the disclosure may activate a service 1107 of the external server 500 based on the response message.

According to various embodiments of the disclosure, the electronic device 300 may confirm a response message, and may activate the communication service available to the external electronic device 400 when the external electronic device 400 can be provided with the valid service. According to another embodiment, when the external electronic device 400 cannot be provided with the valid service, the electronic device 300 may deactivate the communication service of the external electronic device 400.

According to various embodiments of the disclosure, the electronic device 300 may activate the communication service available to the external electronic device 400 according to activation or deactivation in the external server 450, or may deactivate at least a part of the communication service.

An electronic device according to various embodiments of the disclosure may include a memory configured to store device information corresponding to the electronic device; a first communication module comprising communication circuitry configured to establish a first communication connection corresponding to a first communication method with an external server; a second communication module comprising communication circuitry configured to establish a second communication connection corresponding to a second communication method with an external electronic device; and a processor. The processor may be configured to establish the first communication connection with the external server using the first communication module, to transmit the device information to the external server through the first communication connection, to receive one or more service identifiers corresponding to one or more services available to the external electronic device from the external server, to establish the second communication connection with the external electronic device using the second communication module, and to transmit control information based on at least a part of an identifier corresponding to at least one service of the one or more services to the external electronic device to activate the at least one service in the external electronic device.

In the electronic device according to various embodiments of the disclosure, the processor may be configured to transmit, to the external server, another device information corresponding to the external electronic device together with the device information.

In the electronic device according to various embodiments of the disclosure, the processor may be configured to receive an identifier corresponding to a service that is executable in association with the electronic device and the external electronic device, as at least a part of the one or more service identifiers.

In the electronic device according to various embodiments of the disclosure, the processor may be configured to select the service that is executable in association with the electronic device and the external electronic device, as at least a part of the at least one service.

In the electronic device according to various embodiments of the disclosure, the at least one service may not be executable in the electronic device and may be executable in the external electronic device.

In the electronic device according to various embodiments of the disclosure, the processor may be configured to transmit configuration information used to activate a first function associated with the at least one service and/or to deactivate a second function associated with the at least one service in the external electronic device to the external electronic device as at least a part of the control information.

In the electronic device according to various embodiments of the disclosure, the processor may be configured to transmit a request for activating the at least one service to the external server and to receive at least a part of the configuration information from the external server as at least a part of a response to the request.

In the electronic device according to various embodiments of the disclosure, the processor may be configured to acquire the at least a part of the configuration information from at least one piece of configuration information stored in the memory based on at least a part of the identifier corresponding to the at least one service.

In the electronic device according to various embodiments of the disclosure, the second communication connection established through the second communication module may include a short-distance communication connection, the at least one service may include a service that can be provided based on the same phone number with respect to the electronic device and the external electronic device, and the processor may be configured to provide a call forwarding function for the same phone number to the external electronic device using the second communication module when the service is deactivated in the external electronic device.

In the electronic device according to various embodiments of the disclosure, the processor may be configured to transmit another request for a profile to be installed in a UICC of the external electronic device to another external server, and to transmit the profile to the external electronic device when receiving the profile from the other external server as a response to the other request.

In the electronic device according to various embodiments of the disclosure, the processor may be configured to transmit a request for a web address to be used in a subscription to a cellular communication service for the external electronic device to a web server corresponding to the cellular communication service different from the external server and the other external server, when receiving an indication that the profile does not exist in the other external server as the response to the other request.

In the electronic device according to various embodiments of the disclosure, the processor may be configured to control the external electronic device to deactivate the at least one service activated in the external electronic device when receiving a request for deleting the profile from the external electronic device, and to request a web address for communication network use service unsubscription of the external electronic device from the external server.

In the electronic device according to various embodiments of the disclosure, the processor may be configured to receive a designated application corresponding to the at least one service from the external server.

In the electronic device according to various embodiments of the disclosure, the processor may be configured to transmit the designated application to the external electronic device.

An electronic device according to various embodiments of the disclosure may include a memory configured to store device information corresponding to the electronic device and identifiers of one or more services available to an external electronic device; a first communication module comprising communication circuitry configured to establish a first communication connection corresponding to a first communication method with an external server; a second communication module comprising communication circuitry configured to establish a second communication connection corresponding to a second communication method with the external electronic device; and a processor. The processor may be configured to establish the first communication connection with the external server using the first communication module, to transmit the device information to the external server through the first communication connection, to establish the second communication connection with the external electronic device using the second communication module, and to transmit control information based on at least a part of an identifier corresponding to at least one service of the one or more services to the external electronic device to activate the at least one service in the external electronic device.

An electronic device according to various embodiments of the disclosure may include a memory configured to store device information corresponding to the electronic device; a first communication module comprising communication circuitry configured to establish a first communication connection corresponding to a first communication method with an external server; and a processor. The processor may be configured to establish the first communication connection with the external server using the first communication module, to transmit the device information to the external server through the first communication connection, to receive one or more service identifiers corresponding to one or more services available to the electronic device from the external server, and to transmit a signal requesting activation based on at least a part of an identifier corresponding to at least one service of the one or more services to the external server to activate the at least one service in the electronic device.

An electronic device according to various embodiments of the disclosure may include a memory configured to store device information corresponding to the electronic device; a first communication module comprising communication circuitry configured to establish a first communication connection corresponding to a first communication method with an external server; a second communication module comprising communication circuitry configured to establish a second communication connection corresponding to a second communication method with an external electronic device; and a processor. The processor may be configured to establish the second communication connection with the external electronic device using the second communication module, to receive device information of the external electronic device from the external electronic device, to determine whether a profile exists in the external electronic device based on the device information of the external electronic device, to determine whether the external electronic device is first connected to the electronic device in response to determining that the profile exists, and to transmit control information based on at least a part of an identifier corresponding to at least one service available to the external electronic device to the external electronic device to activate the at least one service in the external electronic device based on the determination result.

An electronic device according to various embodiments of the disclosure may include a first communication module comprising communication circuitry configured to establish a first communication connection corresponding to a first communication method with a first external electronic device; and a processor. The processor may be configured to establish the first communication connection with the first external electronic device using the first communication module, to receive device information transmitted by the first external electronic device, and to transmit one or more service identifiers corresponding to one or more services available to a second external electronic device connected to the first external electronic device, to the first external electronic device.

In the electronic device according to various embodiments of the disclosure, the processor may be configured to receive a request for activating the at least one service transmitted by the first external electronic device, and to transmit configuration information about the service requested to be activated to the first external electronic device as at least a part of a response to the request.

In the electronic device according to various embodiments of the disclosure, the processor may be configured to receive a request for transmitting a web address to be used in subscription to a cellular communication service for the second external electronic device, which is transmitted by the first external electronic device, and to transmit the web address to the first external electronic device as at least a part of a response to the request.

Figure 12:
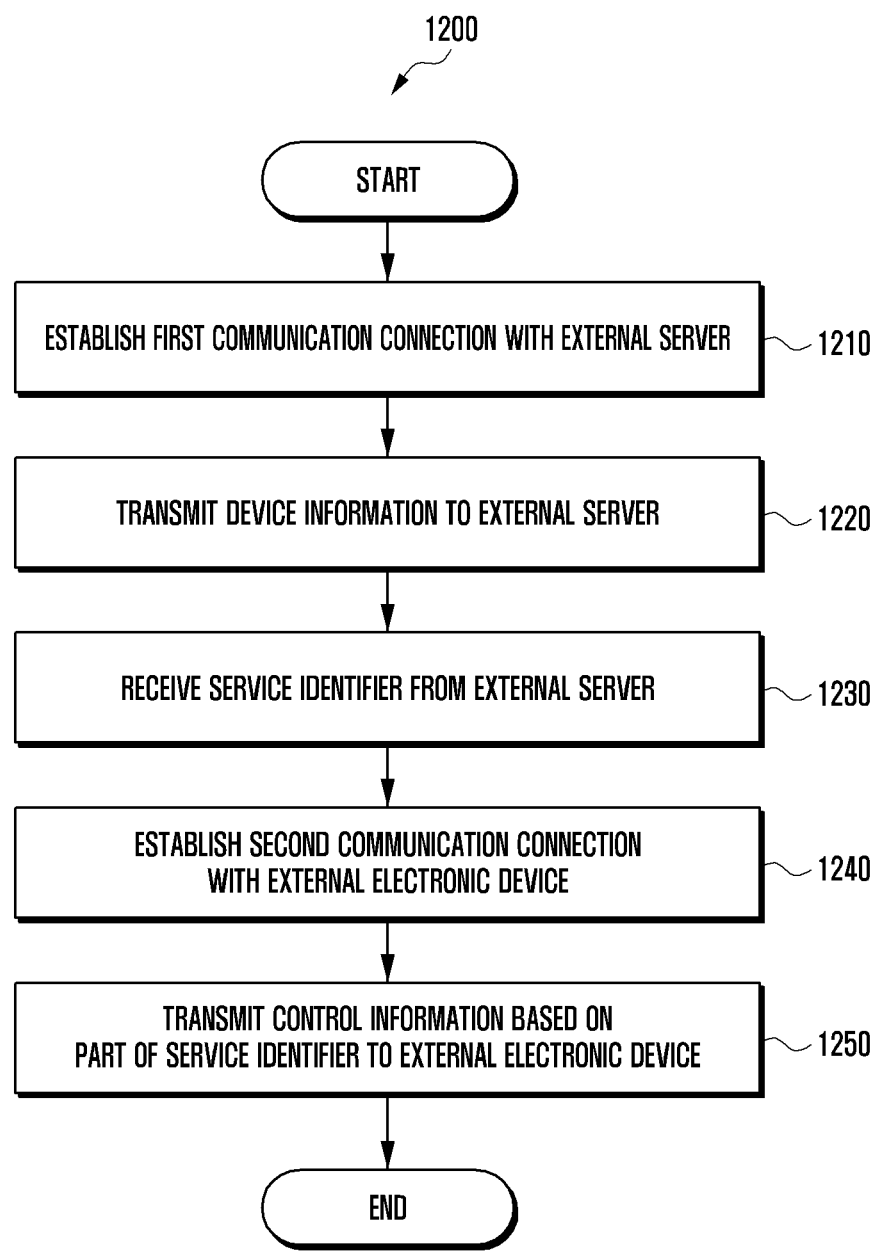
FIG. 12 is a flowchart illustrating a method of operating an electronic device according to various embodiments of the disclosure.

FIG. 12 is a flowchart 1200 illustrating a method of operating an electronic device according to various embodiments of the disclosure.

Referring to FIG. 12, in operation 1210, an electronic device (e.g., the electronic device 300 of FIG. 3) according to various embodiments of the disclosure may establish a first communication connection with an external server (e.g., the external server 450 of FIG. 3).

According to various embodiments of the disclosure, a first communication method may refer to a method of performing a communication service provided by a provider of the external server 450 (e.g., a cellular network, Wi-Fi, or the like). The electronic device 300 may establish the first communication connection with the external server 450, and may transmit and receive data to and from the external server 450.

In operation 1220, the electronic device 300 according to various embodiments of the disclosure may transmit device information to the external server 450.

According to various embodiments of the disclosure, the device information may include device information of the electronic device 300. The device information may include identification information (e.g., which may include various information capable of distinguishing the electronic device 300 from other electronic devices, such as IMSI information of the electronic device 300) of the electronic device 300.

According to various embodiments of the disclosure, the device information may be used for the external server 450 to retrieve a communication service available to the external electronic device 400.

The service available to the external electronic device 400 according to various embodiments of the disclosure may include a service that is executable in association with the electronic device 300 and the external electronic device 400 or a service that is not executable in the electronic device 300 and executable only in the external electronic device 400.

The external server 450 according to various embodiments of the disclosure may retrieve the service available to the external electronic device 400 based on the device information of the electronic device 300, and may transmit identifiers of at least one service available to the external electronic device 400 to the electronic device 300.

In operation 1230, the electronic device 300 according to various embodiments of the disclosure may receive a service identifier transmitted by the external server 450.

In operation 1240, the electronic device 300 according to various embodiments of the disclosure may establish a second communication connection with an external electronic device (e.g., the external electronic device 400 of FIG. 3).

According to various embodiments of the disclosure, the electronic device 300 may control the second communication module 320, and may establish the second communication connection corresponding to the second communication method (e.g., which may include a short-distance communication method such as Bluetooth, Wi-Fi direct, or the like) with the external electronic device 400.

According to various embodiments of the disclosure, the electronic device 300 may establish the second communication connection with the external electronic device 400 in order to perform the following operation 1250.

In operation 1250, the electronic device 300 according to various embodiments of the disclosure may transmit control information based on at least a part of the service identifier to the external electronic device 400.

According to various embodiments of the disclosure, the electronic device 300 may transmit the control information based on at least a part of the identifier corresponding to the at least one service to the external electronic device 400 so that the at least one service can be activated in the external electronic device 400. The control information based on the at least a part of the identifier may include configuration information transmitted by the external server 450.

Figure 13:
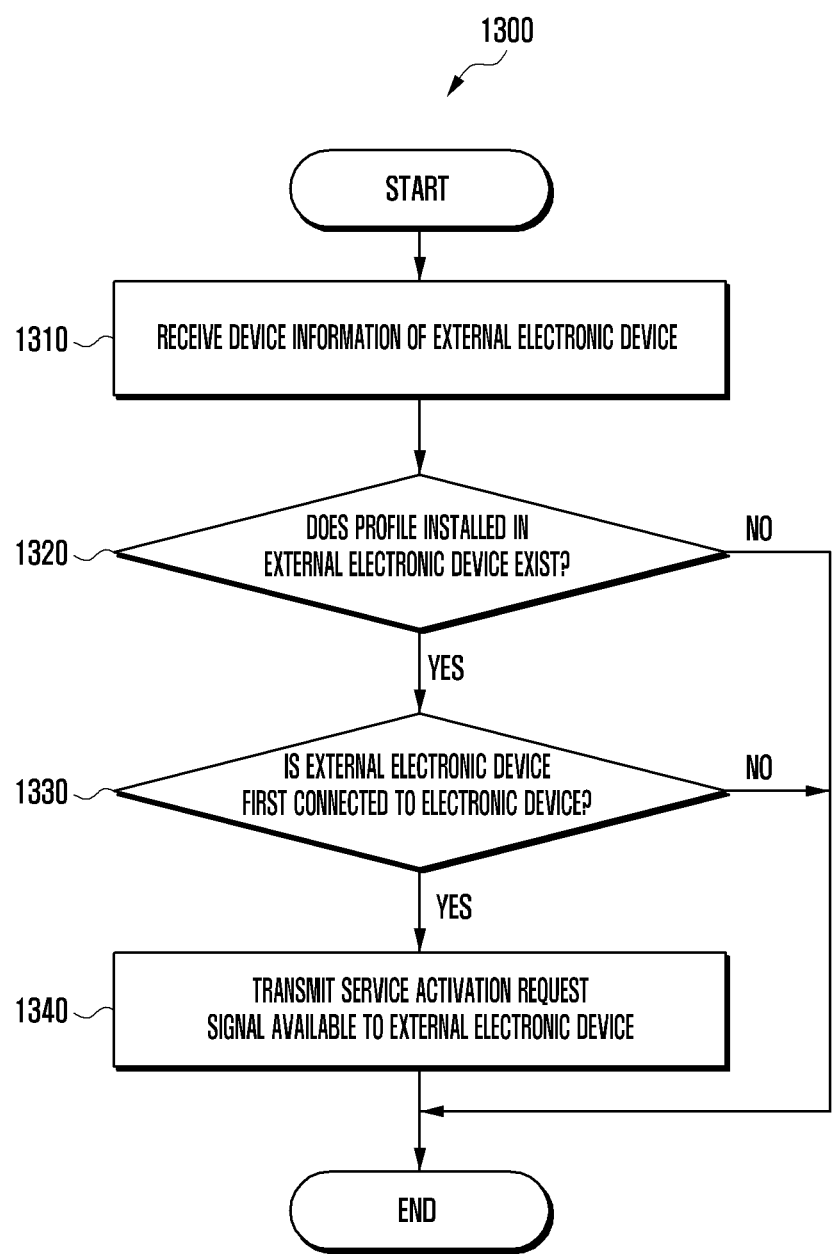
FIG. 13 is a flowchart illustrating a method of operating an electronic device according to another embodiment of the disclosure.

FIG. 13 is a flowchart illustrating a method 1300 of operating an electronic device according to another embodiment of the disclosure.

Referring to FIG. 13, in operation 1310, the electronic device 300 according to various embodiments of the disclosure may receive device information of the external electronic device 400. According to various embodiments of the disclosure, the electronic device 300 and the external electronic device 400 may request device information of the external electronic device (e.g., IMSI information of the external electronic device 400) from the external electronic device 400 in a state in which the second communication connection is established.

In operation 1320, the electronic device 300 according to various embodiments of the disclosure may determine whether a profile to be installed in the external electronic device 400 exists based on the device information of the external electronic device 400.

In operation 1330, the electronic device 300 according to various embodiments of the disclosure may determine whether the external electronic device 400 is first connected to the electronic device 300 in response to determining that the profile exists in the external electronic device 400 ('Yes' of operation 1320).

According to various embodiments of the disclosure, a case where the external electronic device 400 is first connected to the electronic device 300 may be caused by a case where the external electronic device 400 is first connected to the electronic device 300 in a state in which the profile is installed and a case where the external electronic device 400 is connected to the electronic device 300 in a state in which the profile of the electronic device 300 is changed.

In operation 1340, the electronic device 300 according to various embodiments of the disclosure may transmit a signal for requesting activation of a service available to the external electronic device 400 to the external server 450. According to various embodiments of the disclosure, the electronic device 300 may transmit an identifier of the electronic device 300 (e.g., IMSI of the electronic device 300) and an identifier of the external electronic device 400 (e.g., IMSI of the external electronic device 400) to the external server 450. According to various embodiments of the disclosure, the external server 450 may transmit, to the electronic device 300, whether activation of a service requested to be activated is valid using the identifier of the electronic device 300 and the identifier of the external electronic device 400 or service information to which the electronic device 300 is subscribed.

According to various embodiments of the disclosure, the electronic device 300 may activate the communication service available to the external electronic device 400 or deactivate at least a part of the communication service according to activation/deactivation in the external server 450.

Figure 14:
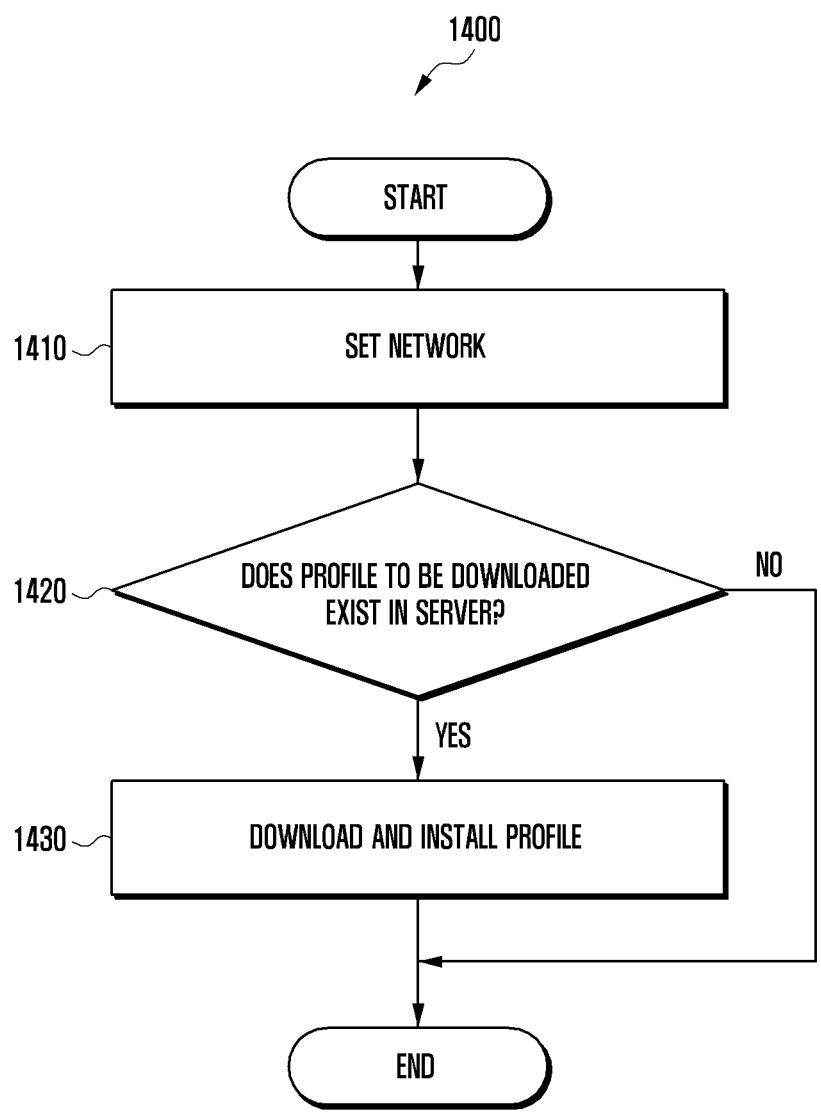
FIG. 14 is a flowchart illustrating an operation in which an electronic device according to various embodiments of the disclosure alone installs a profile.

FIG. 14 is a flowchart 1400 illustrating an operation in which an electronic device (e.g., the external electronic device 400 of FIG. 3) according to various embodiments of the disclosure alone installs a profile.

Referring to FIG. 14, in operation 1410, the external electronic device 400 according to various embodiments of the disclosure may set a network that can be connected to the external server 450. According to various embodiments of the disclosure, the network of the external electronic device 400 may be set to transmit/receive data for communication service subscription with the external server 450 of the external electronic device 400.

In operation 1420, the external electronic device 400 according to various embodiments of the disclosure may determine whether a profile to be downloaded exists in a profile providing server.

The external electronic device 400 may make a connection to an address of a server included in a profile download address list stored in the external electronic device 400 in order to receive the profile, and may attempt to download the profile from the connected server if the connection is successful.

The external electronic device 400 may make a connection to an address of the profile providing server included in the profile download address list stored in the external electronic device 400, and may confirm an MCC of the external electronic device 400 if the downloading of the profile fails. The processor 330 may attempt to make a connection to the address of the profile providing server of at least one communication provider corresponding to the MCC, and may attempt to download the profile in the connected profile providing server.

In operation 1430, if the external electronic device 400 succeeds in downloading the profile, the external electronic device 400 may install the profile on the UICC of the external electronic device 400.

The above-discussed method is described herein with reference to flowchart illustrations, methods, and computer program products according to example embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including at least one instruction that implements the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Certain example aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It is noted that the various example embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various example embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising: a memory configured to store device information corresponding to the electronic device; a first communication module comprising communication circuitry configured to establish a first communication connection corresponding to a first communication method with an external server; a second communication module comprising communication circuitry configured to establish a second communication connection corresponding to a second communication method with an external electronic device; and a processor, wherein the processor is configured to: establish the first communication connection with the external server using the first communication module, transmit the device information to the external server through the first communication connection, receive one or more service identifiers corresponding to one or more services available to the external electronic device from the external server, establish the second communication connection with the external electronic device using the second communication module, transmit control information based on at least a part of an identifier corresponding to at least one service of the one or more services to the external electronic device to set a profile installed in the external electronic device based on the control information for activating the at least one service in the external electronic device, transmit another request for a profile to be installed in a universal integrated circuit card (UICC) of the external electronic device to another external server, transmit the profile to the external electronic device in response to receiving the profile from the other external server as a response to the other request, and transmit a request for a web address to be used in subscription to a cellular communication service for the external electronic device to a web server corresponding to a cellular communication service different from the external server and the other external server, in response to receiving an indication that the profile does not exist in the other external server as the response to the other request.

2. The electronic device of claim 1, wherein the processor is configured to transmit, to the external server, another device information corresponding to the external electronic device together with the device information.

3. The electronic device of claim 1, wherein the processor is configured to receive an identifier corresponding to a service that is executable in association with the electronic device and the external electronic device, as at least a part of the service identifiers.

4. The electronic device of claim 1, wherein the processor is configured to select the service that is executable in association with the electronic device and the external electronic device, as at least a part of the at least one service.

5. The electronic device of claim 1, wherein the at least one service is not executable in the electronic device and is executable in the external electronic device.

6. The electronic device of claim 1, wherein the processor is configured to transmit configuration information used to activate a first function associated with the at least one service and/or to deactivate a second function associated with the at least one service in the external electronic device to the external electronic device as at least a part of the control information.

7. The electronic device of claim 6, wherein the processor is configured to: transmit a request for activating the at least one service to the external server, and receive at least a part of the configuration information from the external server as at least a part of a response to the request.

8. The electronic device of claim 6, wherein the processor is configured to acquire the at least a part of the configuration information used to activate the first function from at least one piece of configuration information stored in the memory based on at least a part of the identifier corresponding to the at least one service.

9. The electronic device of claim 1, wherein the second communication connection established through the second communication module includes a short-distance communication connection, the at least one service includes a service that can be provided based on a same phone number with respect to the electronic device and the external electronic device, and the processor is configured to provide a call forwarding function for the same phone number to the external electronic device using the second communication module when the service is deactivated in the external electronic device.

10. The electronic device of claim 1, wherein the processor is configured to: control the external electronic device to deactivate the at least one service activated in the external electronic device when receiving a request for deleting the profile from the external electronic device, and request a web address for communication network use service unsubscription of the external electronic device from the external server.

11. The electronic device of claim 1, wherein the processor is configured to receive a designated application corresponding to the at least one service from the external server.

12. The electronic device of claim 11, wherein the processor is configured to transmit the designated application to the external electronic device.

13. An electronic device comprising: a memory configured to store device information corresponding to the electronic device; a first communication module comprising communication circuitry configured to establish a first communication connection corresponding to a first communication method with an external server; a second communication module comprising communication circuitry configured to establish a second communication connection corresponding to a second communication method with an external electronic device; and a processor, wherein the processor is configured to: establish the second communication connection with the external electronic device using the second communication module, receive device information of the external electronic device from the external electronic device, determine whether a profile exists in the external electronic device based on the device information of the external electronic device, determine whether the external electronic device is connected to the electronic device in response to determining that the profile exists, transmit control information based on at least a part of an identifier corresponding to at least one service available to the external electronic device to the external electronic device to set the profile based on the control information for activating the at least one service in the external electronic device in response to determining the external electronic device is connected to the electronic device, transmit a request for a profile to be installed in a universal integrated circuit card (UICC) of the external electronic device to another external server, transmit the profile to the external electronic device in response to receiving the profile from the other external server as a response to the other request, and transmit a request for a web address to be used in subscription to a cellular communication service for the external electronic device to a web server corresponding to a cellular communication service different from the external server and the other external server, in response to receiving an indication that the profile does not exist in the other external server as the response to the other request.

* * * * *